United States Patent
Venkatesan et al.

(10) Patent No.: US 12,475,054 B1
(45) Date of Patent: Nov. 18, 2025

(54) DYNAMIC CACHE ALLOCATION IN ARTIFICIAL INTELLIGENCE ACCELERATOR

(71) Applicant: Habana Labs Ltd., Caesarea (IL)

(72) Inventors: Ravi Krishnan Venkatesan, Bangalore (IN); Bharat Kumar Daga, Fremont, CA (US); Eitan Joshua, Ramot Menashe (IL)

(73) Assignee: Habana Labs Ltd., Caeserea (IL)

( * ) Notice: Subject to any disclaimer, the term of this patent is extended or adjusted under 35 U.S.C. 154(b) by 58 days.

(21) Appl. No.: 18/620,278

(22) Filed: Mar. 28, 2024

(51) Int. Cl.
  *G06F 12/08* (2016.01)
  *G06F 12/0868* (2016.01)
  *G06F 12/0891* (2016.01)

(52) U.S. Cl.
  CPC ...... *G06F 12/0891* (2013.01); *G06F 12/0868* (2013.01)

(58) Field of Classification Search
  CPC .......................... G06F 12/0891; G06F 12/0868
  See application file for complete search history.

(56) References Cited

U.S. PATENT DOCUMENTS

| | | | |
|---|---|---|---|
| 11,902,177 B1 * | 2/2024 | Chakravarty | H04L 43/16 |
| 2020/0005116 A1 * | 1/2020 | Kuo | G06N 3/08 |
| 2022/0261357 A1 * | 8/2022 | Gabbai | G06F 12/126 |

FOREIGN PATENT DOCUMENTS

WO WO-2020251593 A1 * 12/2020 ........... G06F 1/3206

OTHER PUBLICATIONS

LCM: LLM-focused Hybrid SPM-cache Architecture with Cache Management for Multi-Core AI Accelerators (Year: 2024).*

* cited by examiner

Primary Examiner — Masud K Khan
(74) Attorney, Agent, or Firm — Akona IP PC

(57) ABSTRACT

A cache allocation module may facilitate dynamic cache allocation in an AI accelerator based on data access patterns. For instance, the cache allocation module may dynamically partition the overall cache in the AI accelerator into one or more processor-side caches and one or more memory-side caches. A cache line may start as being private and may be installed in a processor-side cache. The cache allocation module may dynamically change private cache lines to shared cache lines, e.g., by moving private cache lines from a processor-side cache to a memory-side cache. A private cache line can be read by one compute engine in the AI accelerator, versus a shared cache line may be read by multiple compute engines in the AI processor. After a cache line is moved from a processor-side cache to a memory-side cache, the cache allocation module may invalidate the cache line in the processor-side cache.

20 Claims, 10 Drawing Sheets

DYNAMIC CACHE ALLOCATION IN ARTIFICIAL INTELLIGENCE ACCELERATOR

TECHNICAL FIELD

This disclosure relates generally to artificial intelligence (AI) accelerators, and more specifically, to dynamic cache allocation in AI accelerators.

BACKGROUND

The last decade has witnessed a rapid rise in AI-based data processing, particularly based on deep neural networks (DNNs, also referred to as neural networks). DNNs are widely used in the domains of language processing, image recognition, video understanding, image or video generation, machine translation, mathematical reasoning, and so on. DNNs have extremely high computing demands as there can be hundreds of millions of operations as well as a large amount of data to read and write. Therefore, techniques to improve efficiency of DNNs are needed.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Overview

Figure 1:
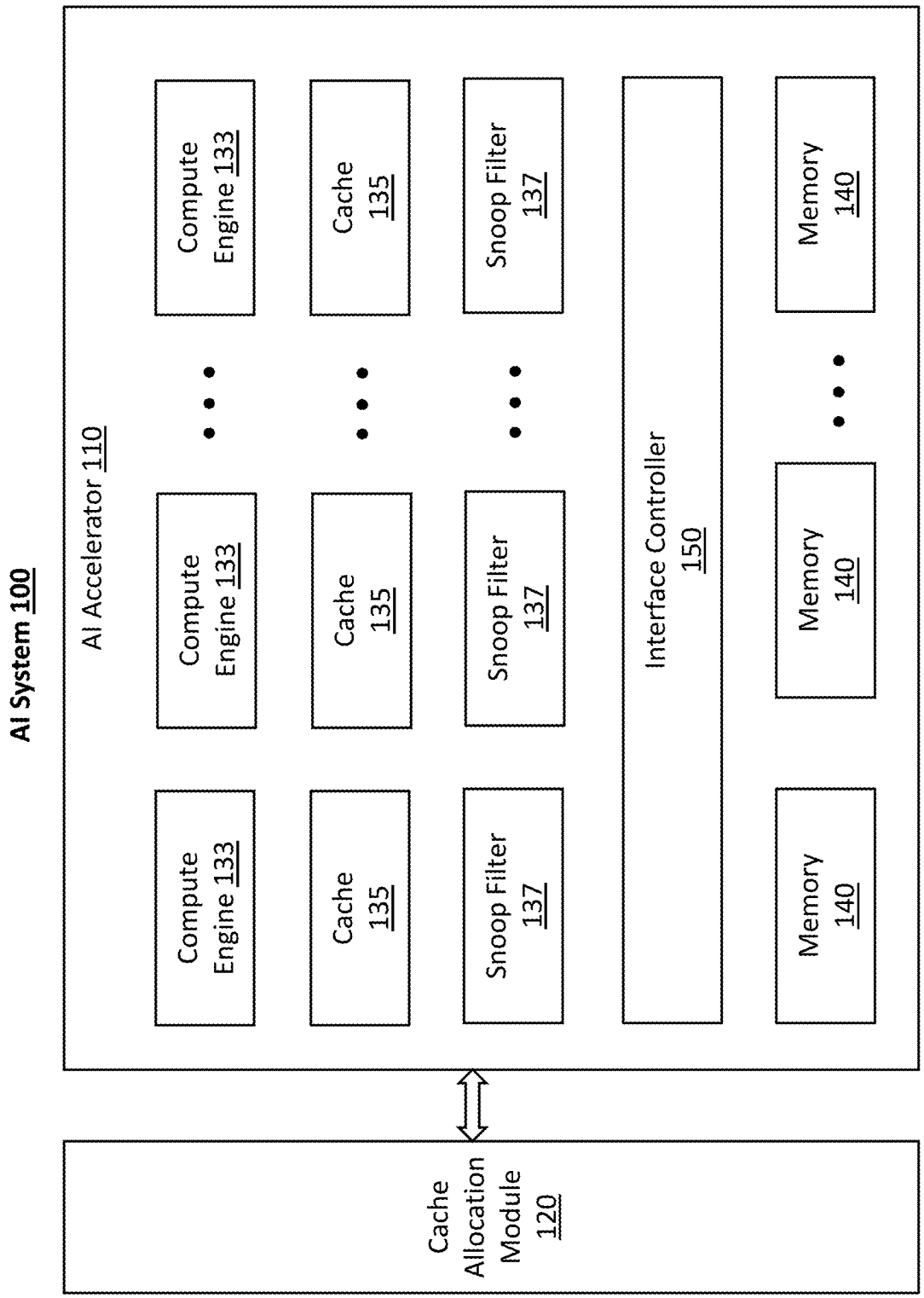
FIG. 1 is a block diagram of an AI system, in accordance with various embodiments.

AI accelerators are also referred to as DNN accelerator, AI processor, neural processing unit, or deep learning processor. An AI accelerator may include compute engines that perform computations in DNNs. Such compute engines usually require high bandwidth from memory to supply data for their compute requirements. The memory bandwidth can be achieved with a combination of on-chip memory (e.g., static random-access memories) and off-chip memory (e.g., dynamic random-access memories). On-chip memory may be used as caches and may be implemented on the same chip as the compute engines. Off-chip memory may be high bandwidth memory. When the number of compute engines in an AI accelerator increases and the memory bandwidth requirement per compute engine remains flat, the total memory bandwidth requirement can increase almost linearly.

On-chip memory may deliver higher bandwidth than off-chip memory but requires more area to increase the capacity. This usually mandates the need to have a highly efficient cache usage to optimally use the existing on-chip memory capacity and deliver maximum memory bandwidth to the compute engines. Having a hardware-managed cache over on-chip memory can simplify software development. However, a hardware managed cache may require efficient cache management to avoid cache thrashing and deliver maximum possible bandwidth.

Currently available approaches provide fine-grained cache allocation and management in last level cache of cores. These allocation and management approaches can determine and increase or decrease the recency of the cache line, facilitating the optimal cache line to evict, based on cache access patterns. Some cache allocation approaches also determine whether to allocate in the core caches or last level cache based on usage and level of sharing between different cores. However, these approaches can add complexity in hardware design and verification of various scenarios. They also require prior knowledge of data usage patterns in applications to determine allocation policy.

Embodiments of the present disclosure may improve on at least some of the challenges and issues described above by dynamically allocating and managing caches in AI accelerators based on data access patterns. Data access patterns in AI accelerators usually have a parallel nature. A large amount of read-only data can be heavily shared among compute engines. Cache can be dynamically allocated as either private cache (i.e., cache that is accessible by one compute engine) or shared cache (i.e., cache that is accessible by multiple compute engines). A private cache may be a processor-side cache. A shared cache may be a memory-side cache. As the same cache can be used as a private cache at a time while a shared cache at another time, dynamic cache allocation and management in the present disclosure can deliver higher memory bandwidth for deep learning workloads than currently available cache allocation approaches. Also, software simplification can be achieved as the dynamic cache allocation and management does not require prior knowledge of data usage patterns in applications (e.g., prior knowledge of which data is private or which data is shared) and does not require prior determination of the allocation policies.

In various embodiments of the present disclosure, an AI system may include an AI accelerator and a cache allocation module. The AI accelerator may include compute engines for performing computations in neural networks and caches associated with the compute engines. The caches may be implemented on the same chip as the compute engines. The cache allocation module may facilitate dynamic allocation of the caches based on patterns in which the compute engines access data. Dynamic cache allocation may be conducted at a cache-line level. For instance, cache may dynamically adapt to either a private cache or a shared cash per client line. Cache line may be the basic unit for cache storage. A cache may include a plurality of cache lines. Each cache line may contain multiple byes or words of data, such as 16 bytes, 32 bytes, 64 bytes, 128 bytes, and so on.

With dynamic cache allocation, cache lines may start as being private. The cache allocation module may dynamically change private cache lines to shared cache lines, e.g., by moving data from a processor-side cache to a memory-side cache or by switching a processor-side cache to a memory-side cache. In an example, when a cache line is requested for the first time, the cache allocation module may install the cache line in a processor-side cache accessible by the compute engine requesting the cache line ("the first requestor"). Later, the cache line may be requested by one or more other compute engines ("subsequent requestors"). In response to a subsequent request of the cache line, the cache allocation module may install the cache line in a memory-side cache. The memory-side cache can be accessed by multiple requestors.

In some embodiments, the AI accelerator may have an architecture including multiple cores. Each core may include a compute engine and a cache. The caches may be a local memory of the core, e.g., an on-chip memory. At least one of the cores may be a home core. The AI accelerator may include one or more snoop filters for cache coherence. The home core may have a home snoop filter, which can track the addresses of off-chip memories. In an example, the AI accelerator may have multiple home snoop filters. For instance, the AI accelerator may have a home snoop filter for each off-chip memory. The number of home snoop filters in the AI accelerator may equal to the number of off-chip memories in the AI accelerator. The cache in the home core is referred to as a home cache, which may be a memory-side cache. A cache line may be moved from a non-home cache to a home cache as it is changed from being a private cache line to being a shared cache line. After a cache line is installed in a home core, the cache allocation module may invalidate the cache line from one or more non-home caches including the cache line, e.g., by removing the cache line from the non-home caches or marking the cache line as a least recently used (LRU) cache line in the non-home caches. In some embodiments, the compute engine in a home core ("home compute engine") may have requested a cache line before the cache line is installed in the home core. In other embodiments, the home compute engine may have not requested the shared cache line before the cache line is installed in the home core, and the cache line is installed in the home core in response to a compute engine in another core requesting the cache line. In some embodiments, before the home compute engine requests a cache line, the cache line may be installed in a non-home cache as a shared cache line. The non-home cache may be a memory-side cache and can be accessed by other cores. The cache allocation module or the non-home core may reduce the LRU weight of the cache line when the cache line is supplied to another core.

For purposes of explanation, specific numbers, materials and configurations are set forth in order to provide a thorough understanding of the illustrative implementations. However, it will be apparent to one skilled in the art that the present disclosure may be practiced without the specific details or/and that the present disclosure may be practiced with only some of the described aspects. In other instances, well known features are omitted or simplified in order not to obscure the illustrative implementations.

Further, references are made to the accompanying drawings that form a part hereof, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed or described operations may be omitted in additional embodiments.

For the purposes of the present disclosure, the phrase "A or B" or the phrase "A and/or B" means (A), (B), or (A and B). For the purposes of the present disclosure, the phrase "A, B, or C" or the phrase "A, B, and/or C" means (A), (B), (C), (A and B), (A and C), (B and C), or (A, B, and C). The term "between," when used with reference to measurement ranges, is inclusive of the ends of the measurement ranges.

The description uses the phrases "in an embodiment" or "in embodiments," which may each refer to one or more of the same or different embodiments. The terms "comprising," "including," "having," and the like, as used with respect to embodiments of the present disclosure, are synonymous. The disclosure may use perspective-based descriptions such as "above," "below," "top," "bottom," and "side" to explain various features of the drawings, but these terms are simply for ease of discussion, and do not imply a desired or required orientation. The accompanying drawings are not necessarily drawn to scale. Unless otherwise specified, the use of the ordinal adjectives "first," "second," and "third," etc., to describe a common object, merely indicates that different instances of like objects are being referred to and are not intended to imply that the objects so described must be in a given sequence, either temporally, spatially, in ranking or in any other manner.

In the following detailed description, various aspects of the illustrative implementations will be described using terms commonly employed by those skilled in the art to convey the substance of their work to others skilled in the art.

The terms "substantially," "close," "approximately," "near," and "about," generally refer to being within +/−20% of a target value as described herein or as known in the art. Similarly, terms indicating orientation of various elements, e.g., "coplanar," "perpendicular," "orthogonal," "parallel," or any other angle between the elements, generally refer to being within +/−5-20% of a target value as described herein or as known in the art.

In addition, the terms "comprise," "comprising," "include," "including," "have," "having" or any other variation thereof, are intended to cover a non-exclusive inclusion. For example, a method, process, device, or DNN accelerator that comprises a list of elements is not necessarily limited to only those elements but may include other elements not expressly listed or inherent to such method, process, device, or DNN accelerators. Also, the term "or" refers to an inclusive "or" and not to an exclusive "or."

The systems, methods and devices of this disclosure each have several innovative aspects, no single one of which is solely responsible for all desirable attributes disclosed herein. Details of one or more implementations of the subject matter described in this specification are set forth in the description below and the accompanying drawings.

Example AI System

FIG. 1 is a block diagram of an AI system 100, in accordance with various embodiments. The AI system 100 includes an AI accelerator 110 and a cache allocation module 120. In other embodiments, alternative configurations, different or additional components may be included in the AI system 100. For example, the AI system 100 may include more than one AI accelerator 110 or more than one cache allocation module 120. Further, functionality attributed to a component of the AI system 100 may be accomplished by a different component included in the AI system 100 or by a different system. In some embodiments, functionality attributed to cache allocation module 120 may be accomplished by the AI accelerator 110 (e.g., by one or more cores in the AI accelerator 110), or vice versa.

The AI accelerator 110 executes DNNs. For instance, the AI accelerator 110 can execute deep learning operations in DNNs for training DNNs or for using trained DNNs to perform tasks. The AI system 100 can execute various types of DNNs, including convolutional neural networks, recurrent neural networks, graph neural networks, transformer neural networks, and so on. An example DNN is the DNN 600 in FIG. 6. As shown in FIG. 1, the AI accelerator 110 includes compute engines 133 (individually referred to as "compute engine 133"), caches 135 (individually referred to as "cache 135"), snoop filters 137 (individually referred to as "snoop filter 137"), an interface controller 150, and memories 140 (individually referred to as "memory 140"). In other embodiments, alternative configurations, different or additional components may be included in the AI accelerator 110. For example, the AI accelerator 110 may include more than one interface controller 150. Further, functionality attributed to a component of the AI accelerator 110 may be accomplished by a different component included in the AI accelerator 110, by the cache allocation module 120, or by a different system. A component of the AI accelerator 110 may be implemented in hardware, software, firmware, or some combination thereof.

The compute engines 133 can perform deep learning operations in DNNs. For instance, a compute engine 133 may execute a DNN layer by running one or more deep learning operations in the DNN layer. A compute engine 133 may execute a layer, or a portion of a layer, at a time. A DNN may include a sequence of layers ("DNN layers"). A DNN layer may include one or more deep learning operations (also referred to as "neural network operations"), such as convolution, pooling, elementwise operation, linear operation, nonlinear operation, and so on. A deep learning operation in a DNN may be performed on one or more internal parameters of the DNNs (e.g., weights), which are determined during the training phase, and one or more activations. An activation may be a data point (also referred to as "data elements" or "elements"). Activations or weights of a DNN layer may be elements of a tensor of the DNN layer. A tensor is a data structure having multiple elements across one or more dimensions. Example tensors include a vector, which is a one-dimensional tensor, and a matrix, which is a two-dimensional tensor. There can also be three-dimensional tensors and even higher dimensional tensors. A DNN layer may have an input tensor (also referred to as "input feature map (IFM)") including one or more input activations (also referred to as "input elements") and a weight tensor including one or more weights. A weight is an element in the weight tensor. A weight tensor of a convolution may be a kernel, a filter, or a group of filters. The output data of the DNN layer may be an output tensor (also referred to as "output feature map (OFM)") that includes one or more output activations (also referred to as "output elements").

In an example, a compute engine 133 may perform convolutions, e.g., standard convolution or depthwise convolution. In some embodiments, the compute engine 133 receives an input tensor and one or more convolutional kernels and performs a convolution with the input tensor and convolutional kernels. The result of the convolution may be an output tensor, which can be further computed, e.g., by the compute engine 133 or another compute engine 133. In some embodiments, the operations of the DNN layers may be run by multiple compute engines 133 in parallel. For instance, multiple compute engines 133 may each perform a portion of a workload for a convolution. Data may be shared between the compute engines 133. A compute engine 133 may also be referred to as a compute tile. In some embodiments, each compute engine 133 may be a processing unit.

A compute engine 133 may include one or more computation units that perform computations on data received by the compute engine 133. A computation unit may include one or more multipliers, one or more adders, subtractors, or other types of components. Examples of computation units include multiply-accumulate (MAC) units. The compute engines 133 may be capable of running various types of deep learning operations, such as convolution, pooling, elementwise operation, linear operation, nonlinear operation, and so on. The compute engines 133 may send out data read requests to read data on which the compute engines 133 perform deep learning operations. The data may be data in input tensor, weight tensors, and so on. A data read request may include one or more memory addresses where the data is stored. After the requested data is received, compute engine 133 may send back a read response that confirms receipt of the data.

The caches 135 store data received, used, or generated by the compute engines 133. A cache 135 may be at least part of a static random-access memory (SRAM). Even though the caches 135 are separate caches in FIG. 1, some or all of the caches 135 may be implemented in a single SRAM. In some embodiments, a cache 135 is paired with a particular compute engine 133. The number of caches 135 in the AI accelerator 110 may equal the number of compute engines 133 in the AI accelerator. Each cache 135 may be associated with a different compute engine 133. The cache 135 may be local to the compute engines 133. For example, the cache 135 may be implemented on the same chip as the compute engine 133. In some embodiments, the cache 135 may be private to the compute engine 133, meaning the cache 135 is accessible by the compute engine 133 but is not accessible by other computer engines 133. In some embodiments, the cache 135 may be a shared cache, meaning the cache 135 is accessible by the compute engine 133 and at least one other computer engine 133. In some embodiments, the state (e.g., whether private or shared) of the cache 135 is controlled at a cache-line level. Whether a cache line is private or shared may be managed by the cache allocation module 120.

In some embodiments, multiple or even all the compute engines 133 and multiple or even all the caches 135 are implemented on the same chip. In some embodiments, one or more of the caches 135 may be memory-side caches, while the other ones of the caches 135 may be processor-side caches. A memory-side cache is closer to at least one of the memories 140 than a processor-side cache. A memory-side cache may be a shared cache accessible by multiple compute engines 133, e.g., the compute engine 133 associated with the memory-side cache plus one or more other compute engines 133. A processor-side cache may be private and accessible by one compute engine, i.e., the compute engine 133 associated with the processor-side cache. The other compute engines 133 may not be able to access the processor-side cache.

In some embodiments, the basic unit of the caches 135 is cache line. A cache 135 may include a predetermined number of cache lines. The number of cache lines in a cache 135 may vary, e.g., 4, 8, 16, 64, 128, 356, 512, 1024, or other numbers. A cache line may have a predetermined number of bytes, such as 8, 16, 32, 64, 128, and so on. The number of bytes in a cache line is the line size. A cache line may be associated with one or more memory addresses that indicate the location of the cache line in the cache 135. In some embodiments, the cache lines in a cache 135 may be organized in an order that is determined based on recency weights of the cache lines. The recency weight of a cache line indicates how recently the cache line is accessed by a compute engine 133, which may be the compute engine 133 associated with the cache 135 or a different compute engine 133. In an example, the most recently used cache line may be placed at the front of the cache 135, while the LRU cache line may be placed at the rear of the cache 135. The LRU cache line would be the first in line to be evicted from the cache 135 (e.g., when a new cache line needs to be added to the cache 135) so that the more recently used cache line(s) can be available in the cache. The recency-based organization of the cache lines can improve data efficiency as the more recently used cache lines are more likely to be accessed again in the near feature.

Cache lines can be added to or removed from the cache 135. For example, a new cache line may be installed into a cache 135 as new data is received. The new data may be data requested by the corresponding computing engine 133 or data allocated to the cache 135 by the cache allocation module 120. As another example, an existing cache line may be invalidated. The invalidation of the cache line may cause the cache line to be removed from the cache 135. The invalidation may be done by the computing engine 133 associated with the cache 135, a different computing engine 133, or the cache allocation module 120. In some embodiments, the invalidation can cause immediate eviction of the cache line from the cache 135 even when the cache line is not the LRU cache line in the cache 135. In other embodiments, the invalidation may be done by reducing the recency weight of the cache line to make the cache line become the LRU cache line in the cache 135 so that the cache line can be evicted from the cache 135 naturally.

The snoop filters 137 monitor or snoop transactions between the caches 135. In some embodiments, every snoop filter 137 is associated with a different cache 135. The number of snoop filters 137 in the AI accelerator 110 may equal the number of caches 135 in the AI accelerator. For instance, when a cache line is migrated from a first cache 135 to a second cache 135, the snoop filter of the first cache 135 may be updated with the new address of the cache line. The snoop filter of the second cache 135 or one or more other caches 135 may also be updated. In some embodiments, the snoop filters 137 may monitor transactions made through the interface controller 150, which includes transactions between the caches 135, transactions between a cache 135 and a memory 140, and so on. A snoop filter 137 may include a finite state controller that can monitor and respond to data transfer requests, including requests from compute engines 133 and from the interface controller 150. In an example where a cache line has a change (e.g., invalidation from a cache 135, installation into a cache 135, mitigation from a cache 135 to another cache 135, etc.), some or even all the snoop filters 137 may update the state of the cache line accordingly. In some embodiments, the snoop filters 137 can track the address of the memories 140 and achieve cache coherence.

The memories 140 store data associated with deep learning operations performed by the AI accelerator 110. In some embodiments, the memories 140 may store data to be used by the compute engines 133 for DNN execution. For example, the memories 140 may store weights, such as weights of convolutional layers, which are determined by training DNNs. As another example, the memories 140 may store inputs to DNNs or outputs of DNNs. The memories 140 may also store data generated by the compute engines 133 from performing deep learning operations in DNNs. A memory 140 may be a main memory of the AI accelerator 110. In some embodiments, the memories 140 includes one or more dynamic random-access memories (DRAMs). A memory 140 may be at least part of a DRAM. In some embodiments, the memories 140 may be various portions of the same DRAM. The memories 140 may be off chip, meaning they are not on the chip that has the compute engines 133 or the caches 135.

Data in the memories 140 may be transferred to or from the caches 135. Each memory 140 may correspond to a different cache 135. Data may be transferred between the memory 140 and the cache 135. The memory 140 may store a copy of data stored in the cache 135. In some embodiments, a direct memory access (DMA) engine may facilitate data transfer between the memory 140 and the cache 135. For example, the DMA engine can read data from the memory 140 and write data into the cache 135. As another example, the DMA engine can read data from the cache 135 and write data into the memory 140. The DMA engine may provide a DMA feature that allows the compute engines 133 to initiate data transfer between the memories 140 and the caches 135 and to perform other operations while the data transfer is being conducted.

In some embodiments, a compute engine 133, the corresponding cache 135, the corresponding snoop filter 137, and the corresponding memory 140 may constitute a core in the AI accelerator 110. The AI accelerator 110 may include a plurality of such cores. One or more cores in the AI accelerator 110 may be home cores. The other cores may be non-home cores. In some embodiments, a home core includes a memory-side cache as opposed to a processor-side cache. A non-home core may include a processor-side cache or a memory-side cache. The home core may be used to supply data to one or more non-home cores in the AI accelerator 110. The data may be used by multiple cores for performing computations in a deep learning operation. The cache 135 in the home core may have a cacheable copy of data that is stored as a cache line in the cache 135. Compute engines 135 in the non-home cores may be able to access the cache line and get a non-cacheable copy of the data. In some embodiments, the home core does not use the data and functions as a supplier of the data. In other embodiments, the home core is also a user of the data and can perform computation on the data.

The interface controller 150 provides interface for data transfer between cores in the AI accelerator 110. The data transfer may include data transfer between the caches 135, data transfer between one or more caches 135 and one or more memories 140, and so on. A data transfer transaction may be initiated by a compute engine 133, such as a compute engine 133 that requests the data for performing a deep learning operation. The interface controller 150 may provide one or more bus interfaces or one or more bus controllers that facilitate transferring the requested data to the compute engine 133. In some embodiments, the interface controller 150 may be a network interface controller that can allow communication among the cores on the same network using cables or wirelessly.

The cache allocation module 120 dynamically allocates and manages the caches 135 at a cache-line level. The cache allocation module 120 may allocate and manage cache lines based on parallel data access patterns in the AI accelerator 110. The same data may be shared by multiple cores in the AI accelerator 110 to perform deep learning operations in DNNs. Every compute engine 133 in all these cores may send out a data read request for reading the data from a cache 135 in which the data is stored as a cache line. The cache allocation module 120 may dynamically change the state of a cache line based on data access pattern. For instance, the cache allocation module 120 may make a cache line private at a time and make the cache line shared at another time. In some embodiments (e.g., embodiments where a shared cache is memory-side and a private cache is process-side), the cache allocation module 120 may dynamically switch from a memory-side cache for shared data and processor-side cache for non-shared data. Memory-side caches have higher storage capacity but lower bandwidth than process-side caches. Read-only data can benefit from the larger cache capacity of memory-side caches. Read/write data, which requires lower cache capacity, can benefit from the higher bandwidth of processor-side caches. The cache allocation module 120 can improve cache allocation by dynamically switching from a memory-side cache for shared data and processor-side cache for non-shared data.

The cache allocation module 120 may allow all cache lines to start as being private cache lines when first requested. As more compute engines 133 requests the data, the cache allocation module 120 may change the cache lines to shared cache lines. A shared cache line may be installed in a cache 135 that is accessible by multiple compute engines 133, e.g., all the computing engines 133 that request the data. In an example, when a cache line is requested by a compute engine 133 for the first time, the cache allocation module 120 may allocate the cache line as a private cache line and allocate the cache 135 associated with the compute engine 133 as a processor-side cache. The cache line is accessible by the compute engine 133 but not by other compute engines 135. After the cache line is requested by another compute engine 133 (i.e., a subsequent requestor), the cache allocation module 120 may change the state of the cache line from a private cache line to a shared cache line and mitigate the cache line to a memory-side cache. The memory-side cache may be a cache 135 in a home core. The cache allocation module 120 may identify the home core from some or even all the cores in the AI accelerator 110. The subsequent requestor may be the compute engine 133 in the home core or the compute engine 133 in a non-home core. When non-home cores request the cache line, the home core can supply the cache line to the non-home cores. The cache allocation module 120 may invalidate the cache line from any other caches 135 that have the cache line, e.g., the cache 135 associated with the first requestor.

In some embodiments, the subsequent requestor in the example above may be the second requestor, i.e., a compute engine 133 that requests the cache line right after the first requestor. The cache allocation module 120 may mitigate the cache line from the first requestor to the home core in response to the second request, no matter whether the second requestor is the home core or not. In other embodiments, the second requestor is a non-home core, and the home core may be the third or even later requestor. The cache allocation module 120 may allow the second requestor (i.e., the non-home) to have a copy of the cache line, which may be stored as a private cache line, till the home core requests the data. After the home core requests the data, the cache allocation module 120 may install the cache line in the cache 135 of the home core and have all the other copies of the cache line invalidated. For instance, the cache allocation module 120 may instruct the home core to invalidate all the other copies of the cache line.

To invalidate a cache line in a cache 135, the cache allocation module 120 may remove (or instruct the home core to remove) the cache line from the cache 135. Alternatively, the cache allocation module 120 may change (or instruct the home core to change) the recency weight of the cache line in the cache 135. For instance, the cache allocation module 120 may make (or instruct the home core to make) the cache line become the LRU cache line in the cache 135 so that when a new cache line is to be installed into the cache 135, the cache line would be evicted from the cache 135. In some embodiments, a non-home core may supply a cache line to another core. The cache allocation module 120 may reduce (or instruct the non-home core to reduce) the recency weight of the cache line to help avoid non-home bombarded for shared data. More details about dynamic cache allocation are provided below in conjunction with FIGS. 2-4 and 5A-5C.

Example Dynamic Cache Allocation

Figure 2:
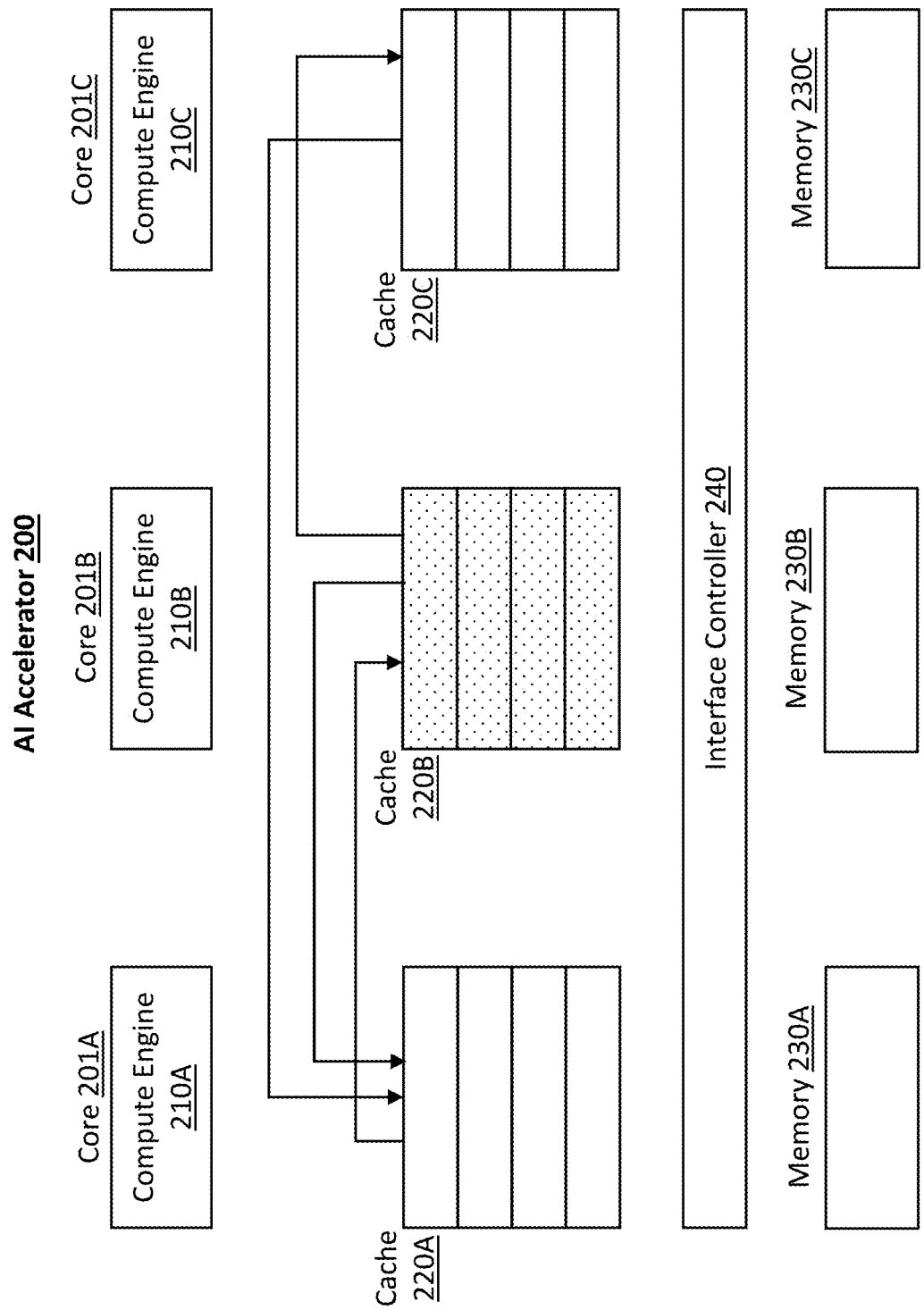
FIG. 2 illustrates dynamic cache allocation in an AI accelerator, in accordance with various embodiments.

FIG. 2 illustrates dynamic cache allocation in an AI accelerator 200, in accordance with various embodiments. The AI accelerator 200 may be an example of the AI accelerator 110 in FIG. 1. As shown in FIG. 2, the AI accelerator 200 includes three cores 201A-201C. The AI accelerator 200 may include fewer or more cores in other embodiments. The core 201A includes a compute engine 210A, a cache 220A, and a memory 230A. The core 201B includes a compute engine 210B, a cache 220B, and a memory 230B. The core 201C includes a compute engine 210C, a cache 220C, and a memory 230C. In other embodiments, a core may include different, fewer, or more components. Even though the caches 220A-220C are shown as three separate caches in FIG. 2, the caches 220A-220C may be portions of the same on-chip memory, which may be a SRAM. Also, even though the memories 230A-230C are shown as three separate memories in FIG. 2, the memories 230A-230C may be portions of the same off-chip memory, which may be a DRAM. The AI accelerator 200 further includes an interface controller 240, which may be an example of the interface controller 150 in FIG. 1.

For the purpose of illustration, the core 201B is a home core in the AI accelerator 200 in the embodiments of FIG. 2. The cores 201A and 201C may be non-home cores. The cache 220A can be accessed by the compute engine 210A but cannot be accessed by the compute engine 210B or the compute engine 210C. Similarly, the cache 220C can be accessed by the compute engine 210C but cannot be accessed by the compute engine 210A or the compute engine 210B. The cache 220B can be accessed by all the compute engines 210A-210C. In some embodiments, the cache 220B is closer to at least one of the memories 230A-230C than the cache 220A or the cache 220C. The cache 220B may be a memory-side cache. The caches 220A and 220C may be processor-side caches. For the purpose of illustration, each of the caches 220A-220C include four cache lines. A cache line is represented by a box in FIG. 2. Each cache line may be used to store a predetermined number of bytes of data. In other embodiments, a cache may include fewer or more cache lines.

In the embodiments of FIG. 2, the compute engine 210A is the first compute engine that sends out a request for data. The request may be a request for reading the data from an off-chip memory, e.g., from one or more of the memories 230A-230C. The core 201A may receive the data in response to the request from the compute engine 210A. A cache line of the received data is installed into the cache 220A as a private cache line. The cache line may be a cacheable copy of the data. The compute engine 210A can access and use the data in the cache line, e.g., for performing a deep learning operation. The cache line cannot be accessed by the compute engine 210B or the compute engine 210C as it is private. Later, the compute engine 210C requests the cache line, as illustrated by the arrow from the cache 220C to the cache 220A. In response to the new request for the cache line, the cache line is mitigated from the cache 220A to the cache 220B, as illustrated by the arrow from the cache 220A to the cache 220B. There may be various ways to mitigate the cache line. In an example, the cache 220A (which is a processor-side cache) may be allocated to become the cache 220B (which is a memory-side cache). In another example, the data in the cache line may be transferred from the cache 220A to the cache 220B.

The arrow from the cache 220B to the cache 220A represents a response from the core 201B to the core 201A that the cache line has been received by the core 201B. After the cache line is installed in the cache 210B, the core 201B can supply the data to other cores, including the core 201C. As represented by the arrow from the cache 220B to the cache 220C in FIG. 2, the core 201B sends the data to the core 201C. The core 201C may get a non-cacheable copy of the data, meaning the cache line is not installed in the cache 220C. The cache line in the cache 220A may be invalidated to avoid having the same cache line in multiple caches, which can improve cache capacity of the AI accelerator 200. For example, the core 201B may remove the cache line from the cache 201A. As another example, the recency weight of the cache line in the cache 201A may be reduced to LRU so that the cache line would be the first in line to be evicted from the cache 201A.

Even though the cache line is installed to the cache 220B based on the data read request from the compute engine 210B in the embodiments of FIG. 2, the cache line may be installed to the cache 220B based on a data read request from the compute engine 210B in other embodiments. The removal of the cache line from the cache 220A can avoid maintaining multiple cacheable copies of the same data in the AI accelerator 200 so the cache capacity of the AI accelerator 200 can be enhanced. As there is no shared cache line, the data protocol can be simplified. However, the cache 220B may store data that the compute engine 210B does not use and function as a hotspot for shared cache lines.

Figure 3:
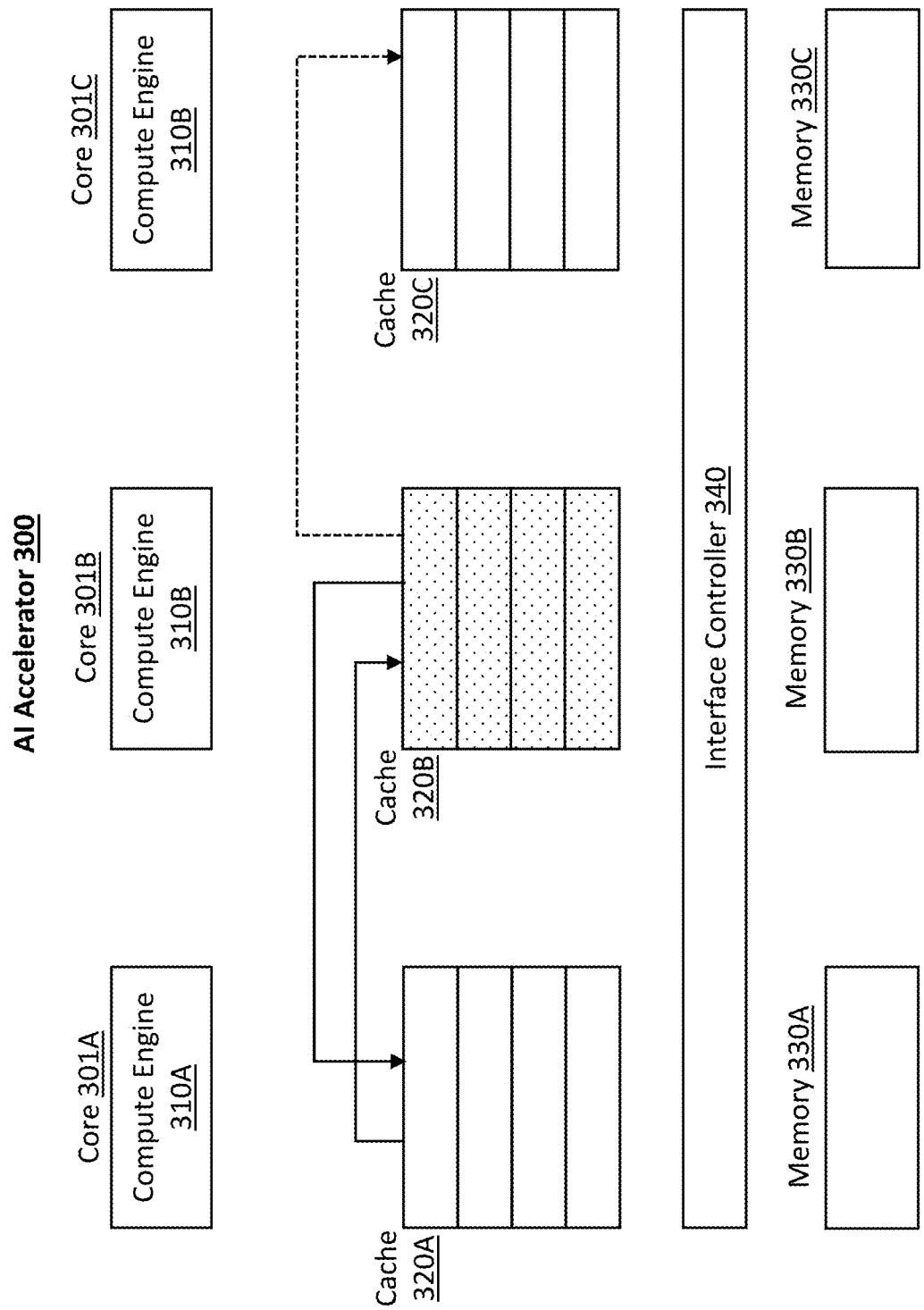
FIG. 3 illustrates dynamic cache allocation in another AI accelerator, in accordance with various embodiments.

FIG. 3 illustrates dynamic cache allocation in another AI accelerator 300, in accordance with various embodiments. The AI accelerator 300 may be an example of the AI accelerator 110 in FIG. 1. As shown in FIG. 3, the AI accelerator 300 includes cores 301A-301C. The AI accelerator 300 may include fewer or more cores in other embodiments. The core 301A includes a compute engine 310A, a cache 320A, and a memory 330A. The core 301B includes a compute engine 310B, a cache 320B, and a memory 330B. The core 301C includes a compute engine 310C, a cache 320C, and a memory 330C. In other embodiments, a core may include different, fewer, or more components. Even though the caches 320A-320C are shown as three separate caches in FIG. 3, the caches 320A-320C may be portions of the same on-chip memory, which may be a SRAM. Also, even though the memories 330A-330C are shown as three separate memories in FIG. 3, the memories 330A-330C may be portions of the same memory, which may be a DRAM. The AI accelerator 300 further includes an interface controller 340, which may be an example of the interface controller 150 in FIG. 1.

For the purpose of illustration, the core 301B is a home core in the AI accelerator 300 in the embodiments of FIG. 3. The cache 320B can be accessed by all the compute engines 310A-310C. The cores 301A and 301C may be non-home cores. The cache 320A can be accessed by the compute engine 310A but cannot be accessed by the compute engine 310B or the compute engine 310C. Similarly, the cache 320C can be accessed by the compute engine 310C but cannot be accessed by the compute engine 310A or the compute engine 310B. In some embodiments, the cache 320B is closer to at least one of the memories 330A-330C than the cache 320A or the cache 320C. The cache 320B may be a memory-side cache. The caches 320A and 320C may be processor-side caches. For the purpose of illustration, each of the caches 320A-320C include four cache lines. A cache line is represented by a box in FIG. 3. Each cache line may be used to store a predetermined number of bytes of data. In other embodiments, a cache may include fewer or more cache lines.

In the embodiments of FIG. 3, the core 301A caches data. The data is stored in a cache line in the cache 320A. The cache line is private. The compute engine 310A may be the first compute engine that sends out a request for the data. The cache line can be installed in the cache 320A in response to the request from the compute engine 310A. The compute engine 310A can access and use the data in the cache line, e.g., to perform a deep learning operation. The cache line cannot be accessed by the compute engine 310B or the compute engine 310C as it is private. Later, the compute engine 310C requests the cache line. Different from the embodiments of FIG. 2, the cache line is not mitigated to the home core. Instead, it is copied into the cache 320C based on the request from the compute engine 310C. The core 301C may cache the data. Two copies of the cache line may be present in the cache 320A and the cache 320C, respectively, at the same time. After the request from the compute engine 310C, the compute engine 310B in the home core requests the cache line. In response to the data read request from the compute engine 310B, the cache line is mitigated from the cache 320A to the cache 320B, as illustrated by the arrow from the cache 320A to the cache 320B. There may be various ways to mitigate the cache line. In an example, the cache 320A (which is a processor-side cache) may be allocated to become the cache 320B (which is a memory-side cache). In another example, the data in the cache line may be transferred from the cache 320A to the cache 320B. The arrow from the cache 320B to the cache 320A represents a response from the core 301B to the core 301A that the cache line has been received by the core 301B.

After the cache line is installed in the cache 310B, the core 301B invalidates the cache line in the core 301A (i.e., the data forwarding core) and the cache line in the core 301C (i.e., data sharing core) by removing the cache line from the cache 310A and the cache 320C. The core 301B may invalidate the cache line in the data forwarding core and all the data sharing core(s) by removing the cache line from the cashes in the data forwarding core and all the data sharing core(s). The dotted arrow in FIG. 3 represents the back invalidation of the cache line in the core 301C. The invalidations result in one copy of the data being cached in the AI accelerator 300, which can improve cache capacity of the AI accelerator 300. The core 301B can supply the data to other cores. When another core requests the data, the core 301B may supply a non-cacheable copy of the data to the requesting core.

Different from the embodiments of FIG. 2, the embodiments of FIG. 3 can have non-home cores to keep a copy of the shared cache line till the home core requests the cache line. In other words, the cache line would not be removed from the non-home cores before the home core requests the cache line. After the home core requests the cache line, the home core can back invalidate the cache line from the non-home cores to remove duplicated copies of the data in the caches of the non-home cores. Therefore, the home core does not have to cache data that it does not use. Shared state of cache lines would need to be managed in protocol. Additional protocol may be needed to send multiple invalidations. Unlike the embodiments of FIG. 2 in which cache capacity can be enhanced once a second requestor requests the cache line, the embodiments of FIG. 3 may not enhance cache capacity until the home core requests the cache line. The home core may function as a hotspot for some shared cache lines.

Figure 4:
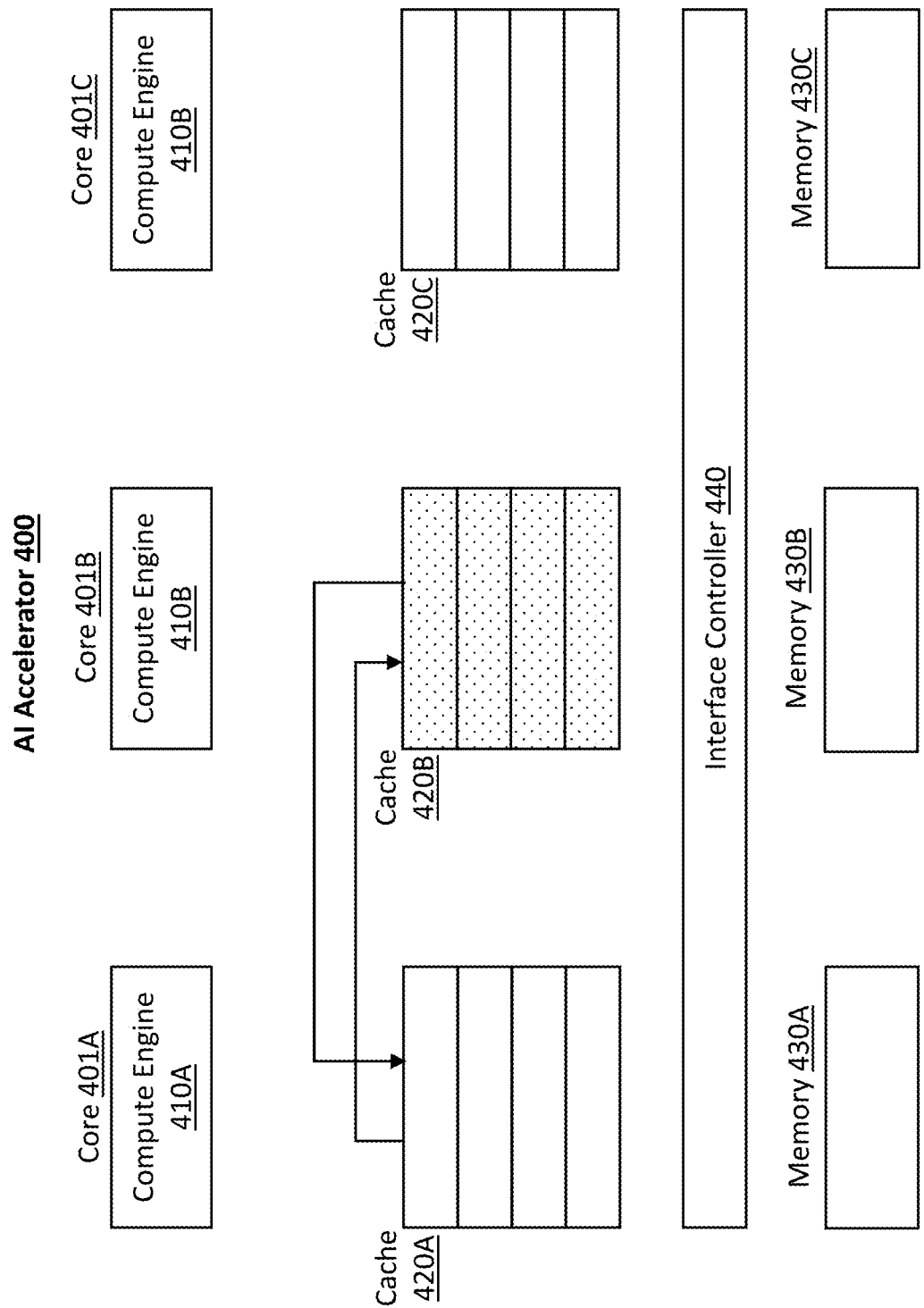
FIG. 4 illustrates dynamic cache allocation based on recency weights of cache lines, in accordance with various embodiments.

FIG. 4 illustrates dynamic cache allocation based on recency weights of cache lines, in accordance with various embodiments. FIG. 4 shows an AI accelerator 400 that includes cores 401A-401C. The AI accelerator 400 may include fewer or more cores in other embodiments. The core 401A includes a compute engine 410A, a cache 420A, and a memory 430A. The core 401B includes a compute engine 410B, a cache 420B, and a memory 430B. The core 401C includes a compute engine 410C, a cache 420C, and a memory 430C. In other embodiments, a core may include different, fewer, or more components. Even though the caches 420A-420C are shown as three separate caches in FIG. 4, the caches 420A-420C may be portions of the same on-chip memory, which may be a SRAM. Also, even though the memories 430A-430C are shown as three separate memories in FIG. 4, the memories 430A-430C may be portions of the same memory, which may be a DRAM. The AI accelerator 400 further includes an interface controller 440, which may be an example of the interface controller 150 in FIG. 1. The AI accelerator 400 may be an example of the AI accelerator 110 in FIG. 1.

For the purpose of illustration, the core 401B is a home core in the AI accelerator 400 in the embodiments of FIG. 4. The cache 420B can be accessed by all the compute engines 410A-410C. The cores 401A and 401C may be non-home cores. The cache 420A can be accessed by the compute engine 410A but cannot be accessed by the compute engine 410B or the compute engine 410C. Similarly, the cache 420C can be accessed by the compute engine 410C but cannot be accessed by the compute engine 410A or the compute engine 410B. In some embodiments, the cache 420B is closer to at least one of the memories 430A-430C than the cache 420A or the cache 420C. The cache 420B may be a memory-side cache. The caches 420A and 420C may be processor-side caches. For the purpose of illustration, each of the caches 420A-420C includes four cache lines. A cache line is represented by a box in FIG. 4. Each cache line may be used to store a predetermined number of bytes of data. In other embodiments, a cache may include fewer or more cache lines.

In the embodiments of FIG. 4, the core 401A caches data. The data is stored in a cache line in the cache 420A. The cache line is private. The compute engine 410A may be the first compute engine that sends out a request for the data. The cache line can be installed in the cache 420A in response to the request from the compute engine 410A. The compute engine 410A can access and use the data in the cache line, e.g., to perform a deep learning operation. The cache line cannot be accessed by the compute engine 410B or the compute engine 410C as it is private. Later, the compute engine 410C requests the cache line. Different from the embodiments of FIG. 2, the cache line is not mitigated to the home core. Instead, it is copied into the cache 420C based on the request from the compute engine 410C. The core 401C may cache the data. Two copies of the cache line may be present in the cache 420A and the cache 420B, respectively, at the same time.

After the request from the compute engine 410C, the compute engine 410B in the home core requests the cache line. In response to the data read request from the compute engine 410B (i.e., from the home core), the cache line is mitigated from the cache 420A to the cache 420B, as illustrated by the arrow from the cache 420A to the cache 420B. There may be various ways to mitigate the cache line. In an example, the cache 420A (which is a processor-side cache) may be allocated to become the cache 420B (which is a memory-side cache). In another example, the data in the cache line may be transferred from the cache 420A to the cache 420B. The arrow from the cache 420B to the cache 420A represents a response from the core 401B to the core 401A that the cache line has been received by the core 401B.

As the cache line is installed in the cache 420B, the core 401B may invalidate the cache line in the core 401A (i.e., the data forwarding core) and in the core 401C (i.e., data sharing core) so that the AI accelerator 300 has one copy of the cache line. To invalidate the cache line in the data forwarding core, the core 401B may remove the cache line from the cache 420A. To invalidate the cache line in data sharing cores, the core 401B may facilitate natural eviction of the cache line from the caches in the data sharing cores. For instance, the core 401B may invalidate the shared cache line in the cache 420C based on a recency weight of the cache line. Cache lines in the cache 420C may be ordered based on how recently the cache lines are accessed. The LRU cache line (i.e., the cache line with the lowest recency weight) would be the first in line to be evicted from the cache based on the assumption that the LRU cache line is the least likely to be accessed again in the near feature. This can ensure that the more recently used cache lines would remain available in the cache, which can improve data read efficiency as the more recently used cache lines are more likely to be accessed again in the near future. In some embodiments, cache lines may have recency weights indicating how recently they are used. The shared cache line in the cache 420C may be associated with a recency weight indicating that the shared cache line is LRU so that the shared cache line can be naturally evited from the cache 420 before the other cache line(s) in the cache 420C. The cache line in the cache 420A may still be invalidated by the compute engine 410B as the cache line is moved from the cache 420A to the cache 420B. Compared with the embodiments of FIG. 3, the LRU-based removal approach can avoid multiple invalidations of the cache line. In an example where four cores have the shared cache line, four invalidations are needed in the embodiment of FIG. 3 versus one invalidation is needed in the embodiments of FIG. 4 as the shared cache line can be removed from the other cores naturally through LRU. The home core in the embodiments of FIG. 4 does not have to cache data that it does not use. Shared state of cache lines would need to be managed in protocol. Cache capacity may be enhanced lazily. The home core may function as a hotspot for some shared cache lines.

Figure 5A:
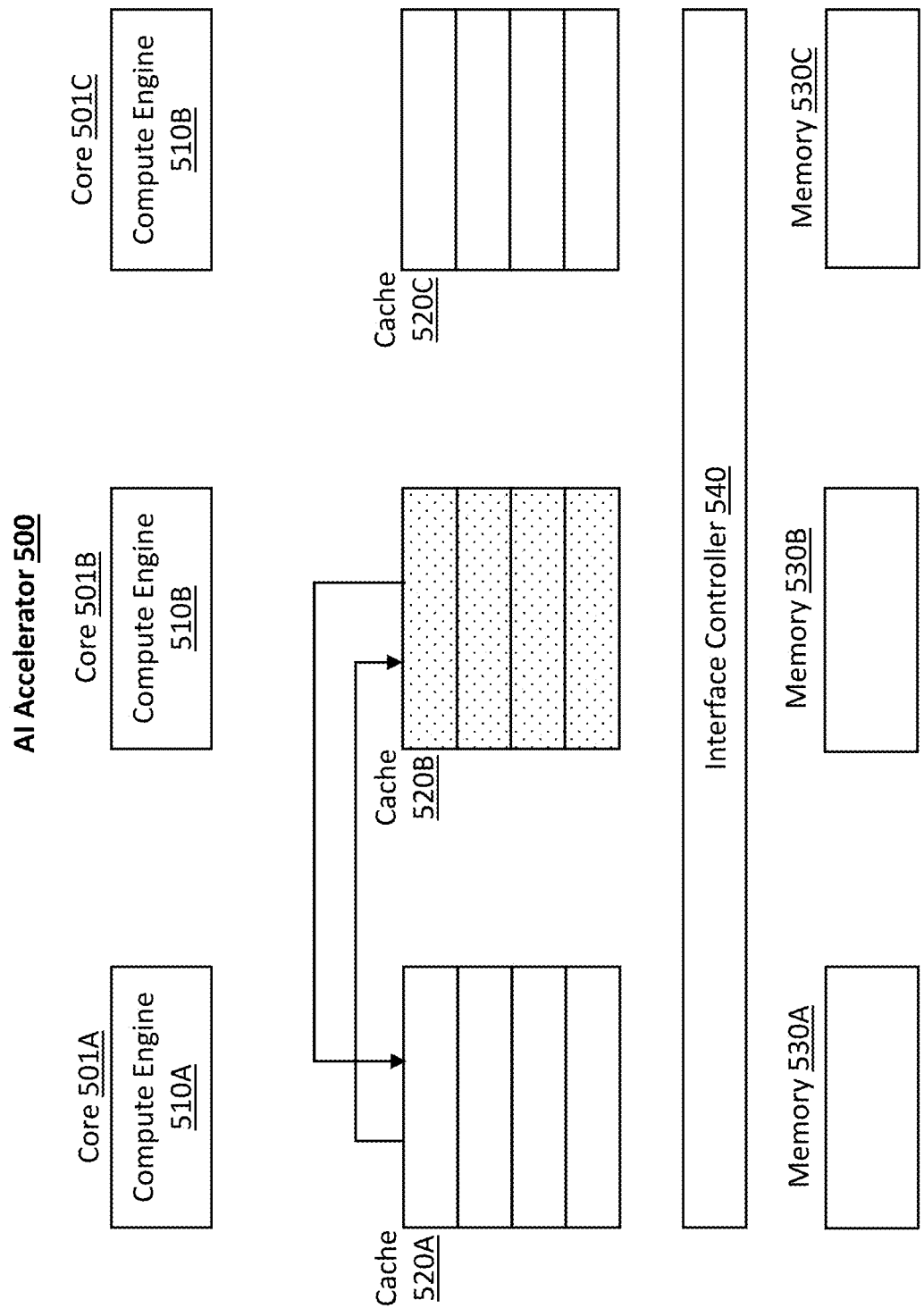
FIGS. 5A-5C illustrate dynamic cache allocation with multiple cores supplying shared data, in accordance with various embodiments.
Figure 5B:
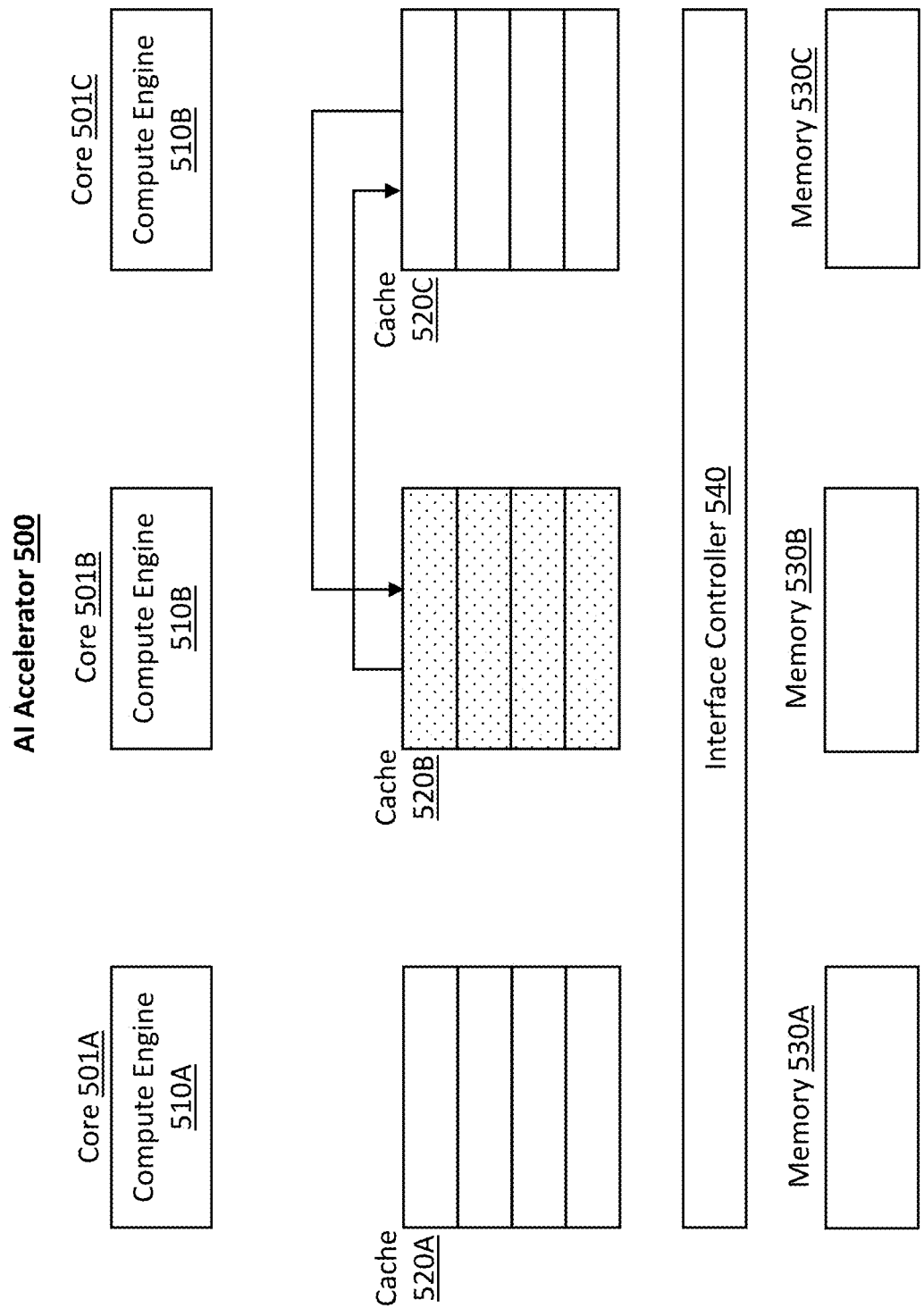
Figure 5C:
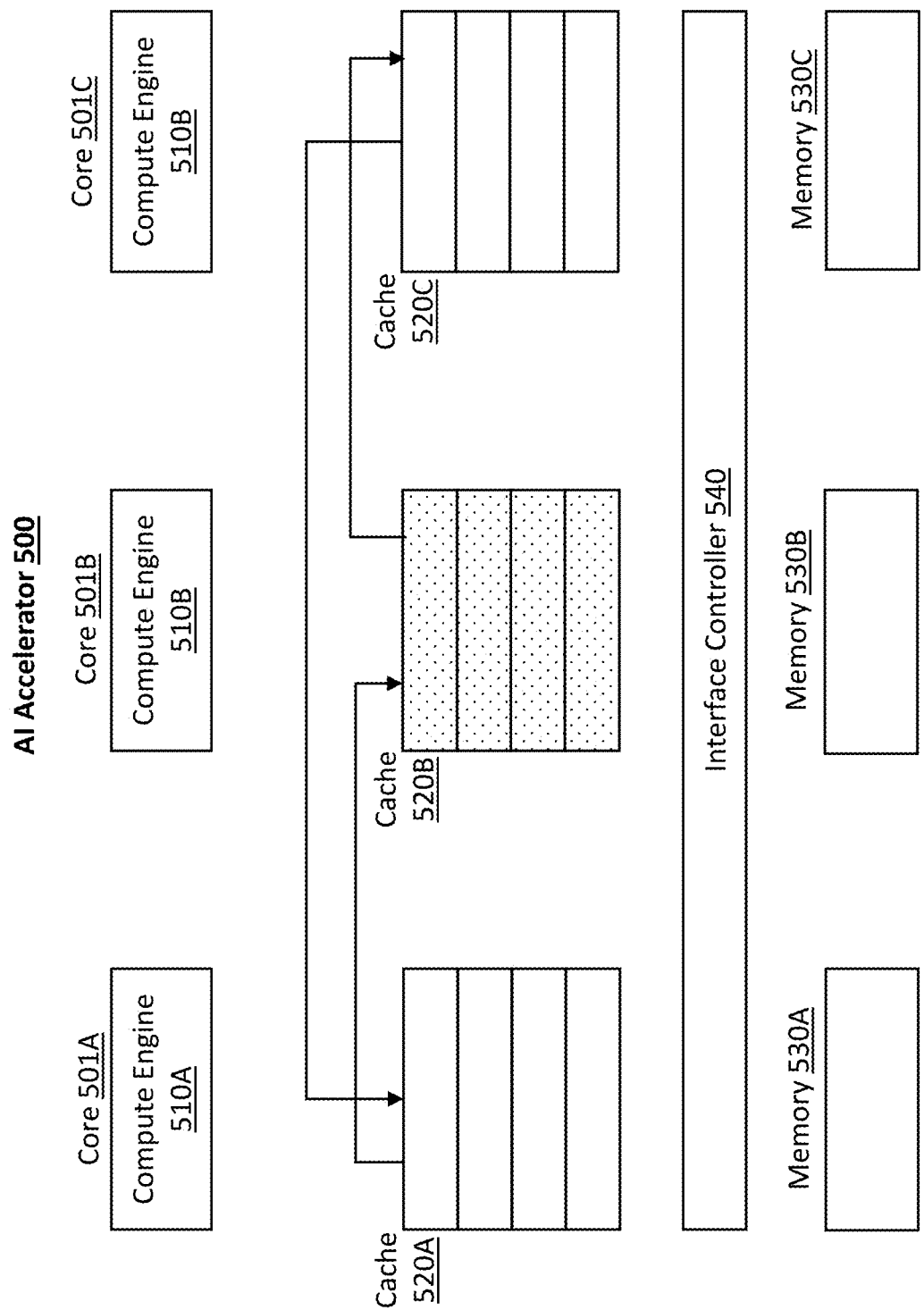

FIGS. 5A-5C illustrate dynamic cache allocation with multiple cores supplying shared data, in accordance with various embodiments. FIGS. 5A-5C show an AI accelerator 500 that includes cores 501A-501C. The AI accelerator 500 may include fewer or more cores in other embodiments. The core 501A includes a compute engine 510A, a cache 520A, and a memory 530A. The core 501B includes a compute engine 510B, a cache 520B, and a memory 530B. The core 501C includes a compute engine 510C, a cache 520C, and a memory 530C. In other embodiments, a core may include different, fewer, or more components. Even though the caches 520A-520C are shown as three separate caches in FIG. 5, the caches 520A-520C may be portions of the same on-chip memory, which may be a SRAM. Also, even though the memories 530A-530C are shown as three separate memories in FIG. 5, the memories 530A-530C may be portions of the same memory, which may be a DRAM. The AI accelerator 500 further includes an interface controller 540, which may be an example of the interface controller 150 in FIG. 1. The AI accelerator 500 may be an example of the AI accelerator 110 in FIG. 1.

In the embodiments of FIGS. 5A-5C, when a cache line is requested by a core, the cache line may start as being private to the core. The private cache line may stay with the requesting core. The cache line may be mitigated to the home core in embodiments where the home core requests the cache line. In embodiment where the home core does not request the cache line, the cache line may be mitigated to the first requesting core. In embodiments where a non-home core supplies data to another requestor, the non-home core may reduce the recency weight of the cache line. For instance, the non-home core may make the cache line an LRU cache line in the cache of the other requestor. The reduction of the recency weight can prevent non-home cores from being bombarded for shared data. The protocol can be simplified by reducing or even avoiding shared cache lines. The AI accelerator 500 may have one cacheable copy of the data, which can enhance cache capacity. The home core may function as a hotspot for some shared cache lines.

In FIG. 5A, the core 501A first gets a cacheable copy of data. The data is stored as a cache line in the cache 520A. The cache line is private. Later, the core 501B requests the cache line. In response to the request, the cache line is moved from the cache 520A to the cache 520B. The cache line in the cache 520A may be invalidated so that the core 501A does not have any cacheable copy of the data anymore. The core 501A may supply the data (e.g., non-cacheable copies of the data) to other cores in the AI accelerator 500. The cache 520B may be a memory-side cache in the embodiments of FIG. 5A.

In FIG. 5B, the core 501C has data that is stored as a cache line in the cache 520C. The cache line may be a cacheable copy of the data. The core 501B requests the data, and the core 501C supplies the shared data to the core 501B, as indicated by the arrows in FIG. 5B. The core 501B may get a non-cacheable copy of the data. The cache 520C may be a memory-side cache in the embodiments of FIG. 5B.

In FIG. 5C, the core 501B has data that is stored as a cache line in the cache 520B. The cache line may be a cacheable copy of the data. The core 501B receives the data from the core 501A, as represented by the arrow from the cache 520A to the cache 520B. The core 501C requests the data from the core 501A, as represented by the arrow from the cache 520C to the cache 520A. The core 501C gets a non-cacheable copy of the data from the core 501B, as represented by the arrow from the cache 520C to the cache 520B. Additional requests may cause forward hop from the core 501A to the core 501B.

Even though the AI accelerators 200, 300, 400, and 500 each have one home core and two non-home cores, the AI accelerator 200, 300, 400, or 500 may include a different number of home cores or include a different number of non-home cores. In an example, the AI accelerator 200, 300, 400, or 500 may include multiple groups of cores. Each group of cores may have a home core and one or more non-home cores. The home core in a group may supply cache lines to the non-home cores in the group.

Example DNN

Figure 6:
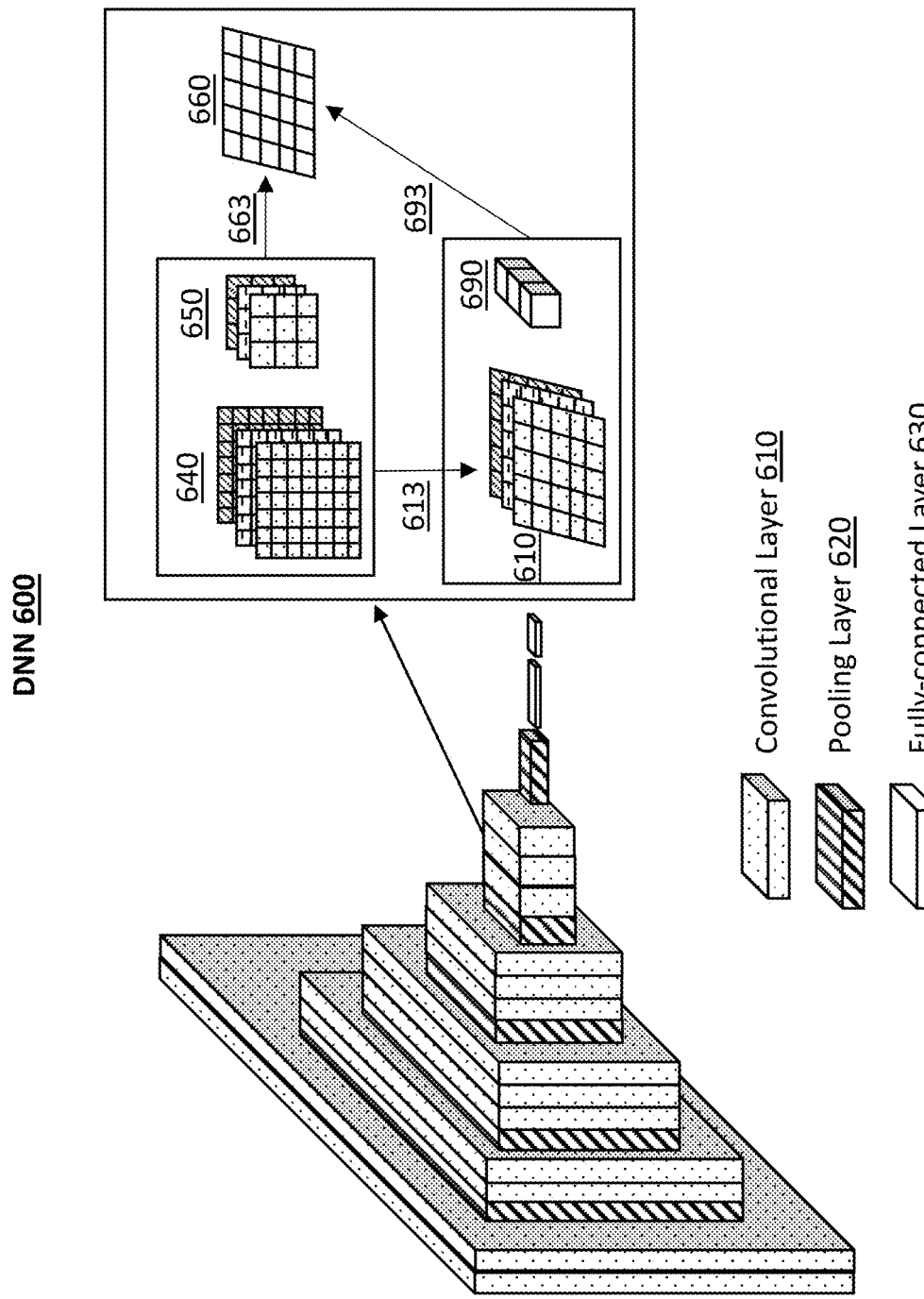
FIG. 6 illustrates an example DNN, in accordance with various embodiments.

FIG. 6 illustrates an example DNN 600, in accordance with various embodiments. The DNN 600 (or part of the DNN 600) may be an example of DNNs that can be trained or executed by AI accelerators, such as the AI accelerator 110, AI accelerator 200, AI accelerator 300, AI accelerator 400, and AI accelerator 500. In the embodiments of FIG. 6, the DNN 600 includes a sequence of layers comprising a plurality of convolutional layers 610 (individually referred to as "convolutional layer 610"), a plurality of pooling layers 620 (individually referred to as "pooling layer 620"), and a plurality of fully-connected layers 630 (individually referred to as "fully-connected layer 630"). In other embodiments, the DNN 600 may include fewer, more, or different layers. In an inference of the DNN 600, the layers of the DNN 600 execute tensor computation that includes many tensor operations, such as convolution (e.g., multiply-accumulate (MAC) operations, etc.), pooling operations, elementwise operations (e.g., elementwise addition, elementwise multiplication, etc.), other types of tensor operations, or some combination thereof.

The convolutional layers 610 summarize the presence of features in the input to the DNN 600. The convolutional layers 610 function as feature extractors. The first layer of the DNN 600 is a convolutional layer 610. In an example, a convolutional layer 610 performs a convolution on an input tensor 640 (also referred to as IFM 640) and a filter 650. As shown in FIG. 6, the IFM 640 is represented by a 7×7×3 three-dimensional (3D) matrix. The IFM 640 includes 3 input channels, each of which is represented by a 7×7 two-dimensional (2D) matrix. The 7×7 2D matrix includes 7 input elements (also referred to as input points) in each row and seven input elements in each column. The filter 650 is represented by a 3×3×3 3D matrix. The filter 650 includes 3 kernels, each of which may correspond to a different input channel of the IFM 640. A kernel is a 2D matrix of weights, where the weights are arranged in columns and rows. A kernel can be smaller than the IFM. In the embodiments of FIG. 6, each kernel is represented by a 3×3 2D matrix. The 3×3 kernel includes 3 weights in each row and three weights in each column. Weights can be initialized and updated by backpropagation using gradient descent. The magnitudes of the weights can indicate importance of the filter 650 in extracting features from the IFM 640.

The convolution includes MAC operations with the input elements in the IFM 640 and the weights in the filter 650. The convolution may be a standard convolution 663 or a depthwise convolution 683. In the standard convolution 663, the whole filter 650 slides across the IFM 640. All the input channels are combined to produce an output tensor 660 (also referred to as OFM 660). The OFM 660 is represented by a 5×5 2D matrix. The 5×5 2D matrix includes 5 output elements (also referred to as output points) in each row and five output elements in each column. For the purpose of illustration, the standard convolution includes one filter in the embodiments of FIG. 6. In embodiments where there are multiple filters, the standard convolution may produce multiple output channels in the OFM 660.

The multiplication applied between a kernel-sized patch of the IFM 640 and a kernel may be a dot product. A dot product is the elementwise multiplication between the kernel-sized patch of the IFM 640 and the corresponding kernel, which is then summed, always resulting in a single value. Because it results in a single value, the operation is often referred to as the "scalar product." Using a kernel smaller than the IFM 640 is intentional as it allows the same kernel (set of weights) to be multiplied by the IFM 640 multiple times at different points on the IFM 640. Specifically, the kernel is applied systematically to each overlapping part or kernel-sized patch of the IFM 640, left to right, top to bottom. The result from multiplying the kernel with the IFM 640 one time is a single value. As the kernel is applied multiple times to the IFM 640, the multiplication result is a 2D matrix of output elements. As such, the 2D output matrix (i.e., the OFM 660) from the standard convolution 663 is referred to as an OFM.

In the depthwise convolution 683, the input channels are not combined. Rather, MAC operations are performed on an individual input channel and an individual kernel and produce an output channel. As shown in FIG. 6, the depthwise convolution 683 produces a depthwise output tensor 680. The depthwise output tensor 680 is represented by a 5×5×3 3D matrix. The depthwise output tensor 680 includes 3 output channels, each of which is represented by a 5×5 2D matrix. The 5×5 2D matrix includes 5 output elements in each row and five output elements in each column. Each output channel is a result of MAC operations of an input channel of the IFM 640 and a kernel of the filter 650. For instance, the first output channel (patterned with dots) is a result of MAC operations of the first input channel (patterned with dots) and the first kernel (patterned with dots), the second output channel (patterned with horizontal strips) is a result of MAC operations of the second input channel (patterned with horizontal strips) and the second kernel (patterned with horizontal strips), and the third output channel (patterned with diagonal stripes) is a result of MAC operations of the third input channel (patterned with diagonal stripes) and the third kernel (patterned with diagonal stripes). In such a depthwise convolution, the number of input channels equals the number of output channels, and each output channel corresponds to a different input channel. The input channels and output channels are referred to collectively as depthwise channels. After the depthwise convolution, a pointwise convolution 693 is then performed on the depthwise output tensor 680 and a 6×1×3 tensor 690 to produce the OFM 660.

The OFM 660 is then passed to the next layer in the sequence. In some embodiments, the OFM 660 is passed through an activation function. An example activation function is rectified linear unit (ReLU). ReLU is a calculation that returns the value provided as input directly, or the value zero if the input is zero or less. The convolutional layer 610 may receive several images as input and calculate the convolution of each of them with each of the kernels. This process can be repeated several times. For instance, the OFM 660 is passed to the subsequent convolutional layer 610 (i.e., the convolutional layer 610 following the convolutional layer 610 generating the OFM 660 in the sequence). The subsequent convolutional layers 610 perform a convolution on the OFM 660 with new kernels and generate a new feature map. The new feature map may also be normalized and resized. The new feature map can be kernelled again by a further subsequent convolutional layer 610, and so on.

In some embodiments, a convolutional layer 610 has four hyperparameters: the number of kernels, the size F kernels (e.g., a kernel is of dimensions F×F×D pixels), the S step with which the window corresponding to the kernel is dragged on the image (e.g., a step of one means moving the window one pixel at a time), and the zero-padding P (e.g., adding a black contour of P pixels thickness to the input image of the convolutional layer 610). The convolutional layers 610 may perform various types of convolutions, such as 2-dimensional convolution, dilated or atrous convolution, spatial separable convolution, depthwise separable convolution, transposed convolution, and so on. The DNN 600 includes 66 convolutional layers 610. In other embodiments, the DNN 600 may include a different number of convolutional layers.

The pooling layers 620 down-sample feature maps generated by the convolutional layers, e.g., by summarizing the presence of features in the patches of the feature maps. A pooling layer 620 is placed between two convolution layers 610: a preceding convolutional layer 610 (the convolution layer 610 preceding the pooling layer 620 in the sequence of layers) and a subsequent convolutional layer 610 (the convolution layer 610 subsequent to the pooling layer 620 in the sequence of layers). In some embodiments, a pooling layer 620 is added after a convolutional layer 610, e.g., after an activation function (e.g., ReLU, etc.) has been applied to the OFM 660.

A pooling layer 620 receives feature maps generated by the preceding convolution layer 610 and applies a pooling operation to the feature maps. The pooling operation reduces the size of the feature maps while preserving their important characteristics. Accordingly, the pooling operation improves the efficiency of the CNN and avoids over-learning. The pooling layers 620 may perform the pooling operation through average pooling (calculating the average value for each patch on the feature map), max pooling (calculating the maximum value for each patch of the feature map), or a combination of both. The size of the pooling operation is smaller than the size of the feature maps. In various embodiments, the pooling operation is 2×2 pixels applied with a stride of two pixels, so that the pooling operation reduces the size of a feature map by a factor of 2, e.g., the number of pixels or values in the feature map is reduced to one quarter the size. In an example, a pooling layer 620 applied to a feature map of 6×6 results in an output pooled feature map of 3×3. The output of the pooling layer 620 is inputted into the subsequent convolution layer 610 for further feature extraction. In some embodiments, the pooling layer 620 operates upon each feature map separately to create a new set of the same number of pooled feature maps.

The fully-connected layers 630 are the last layers of the CNN. The fully-connected layers 630 may be convolutional or not. The fully-connected layers 630 may also be referred to as linear layers. In some embodiments, a fully-connected layer 630 (e.g., the first fully-connected layer in the DNN 600) may receive an input operand. The input operand may define the output of the convolutional layers 610 and pooling layers 620 and includes the values of the last feature map generated by the last pooling layer 620 in the sequence. The fully-connected layer 630 may apply a linear transformation to the input operand through a weight matrix. The weight matrix may be a kernel of the fully-connected layer 630. The linear transformation may include a tensor multiplication between the input operand and the weight matrix. The result of the linear transformation may be an output operand. In some embodiments, the fully-connected layer may further apply a nonlinear transformation (e.g., by using a nonlinear activation function) on the result of the linear transformation to generate an output operand. The output operand may contain as many elements as there are classes: element i represents the probability that the image belongs to class i. Each element is therefore between 0 and 6, and the sum of all is worth one. These probabilities are calculated by the last fully-connected layer 630 by using a logistic function (binary classification) or a SoftMax function (multi-class classification) as an activation function.

Example Method of Cache Allocation in AI Accelerator

Figure 7:
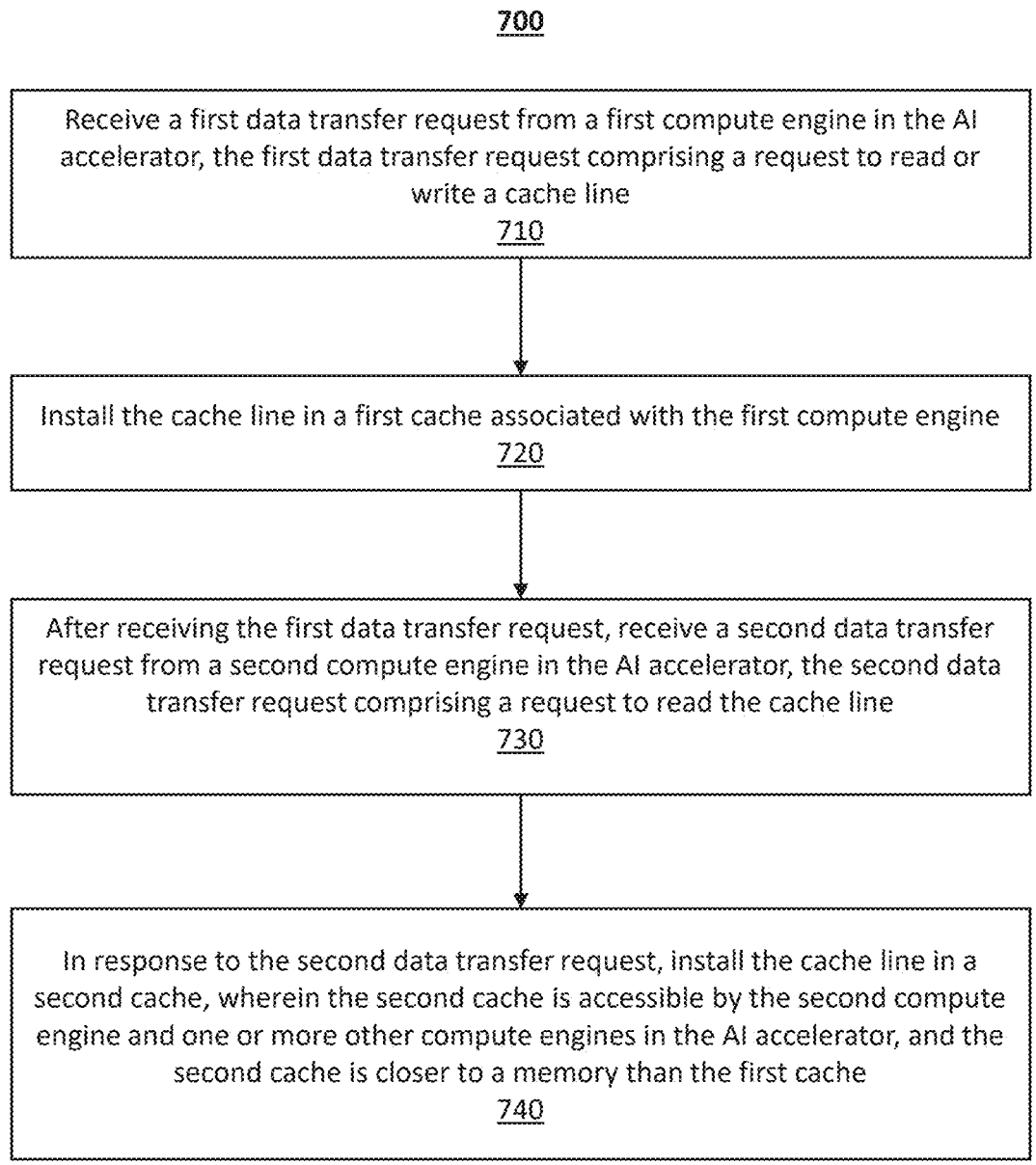
FIG. 7 is a flowchart showing a method of cache allocation in an AI accelerator, in accordance with various embodiments.

FIG. 7 is a flowchart showing a method 700 of cache allocation in an AI accelerator, in accordance with various embodiments. The method 700 may be performed by the cache allocation module 120 in FIG. 1. Although the method 700 is described with reference to the flowchart illustrated in FIG. 7, many other methods for cache allocation in AI accelerators may alternatively be used. For example, the order of execution of the steps in FIG. 7 may be changed. As another example, some of the steps may be changed, eliminated, or combined.

The cache allocation module 120 receives 710 a first data transfer request from a first compute engine in the AI accelerator, the first data transfer request comprising a request to read or write a cache line. In some embodiments, the AI accelerator comprises a plurality of cores. A core comprises a compute engine and a cache. Examples of the AI accelerator may include the AI accelerator 110, AI accelerator 200, AI accelerator 300, AI accelerator 400, and AI accelerator 500.

The cache allocation module 120 installs 720 the cache line in a first cache associated with the first compute engine. In some embodiments, the first cache and the first compute engine are in a first core of the AI accelerator.

The cache allocation module 120 receives 730 a second data transfer request from a second compute engine in the AI accelerator after receiving the first data transfer request. The second data transfer request comprises a request to read the cache line.

The cache allocation module 120 installs 740 installing the cache line in a second cache in response to the second data transfer request. The second cache is accessible by the second compute engine and one or more other compute engines in the AI accelerator. The second cache is closer to a memory than the first cache. In some embodiments, the cache allocation module 120 invalidates the cache line in the first cache. In some embodiments, the second cache is in a second core of the AI accelerator. In some embodiments, the second core comprises the second compute engine. In other embodiments, the second core comprises a third compute engine. The second compute engine is in a third core of the AI accelerator.

In some embodiments, the cache allocation module 120 receives a third data transfer request from a third compute engine in the AI accelerator. The third data transfer request comprises a request to read another cache line installed in the first cache. The cache allocation module 120 moves the another cache line from the first cache to the second cache.

In some embodiments, the cache allocation module 120 receives a third data transfer request from a third compute engine in the AI accelerator before receiving the second data transfer request. The third data transfer request comprises a request to read the cache line. The cache allocation module 120 installs the cache line in a third cache associated with the third compute engine. The cache allocation module 120 invalidates the cache line from the first cache and in the third cache after receiving the second data transfer request. In some embodiments, the cache allocation module 120 invalidates the cache line in the third cache by changing a state of the cache line in the third cache to LRU.

In some embodiments, the cache allocation module 120 receives third data transfer request from a third compute engine in the AI accelerator before receiving the second data transfer request. The third data transfer request comprises a request to read the cache line. The cache allocation module 120 transfers the cache line from the first cache to a third cache associated with the third compute engine. In some embodiments, the cache allocation module 120 transfers the cache line by reducing a weight of the cache line in the third cache. The weight indicates a recency of the cache line being used by the third compute engine.

Example Computing Device

Figure 8:
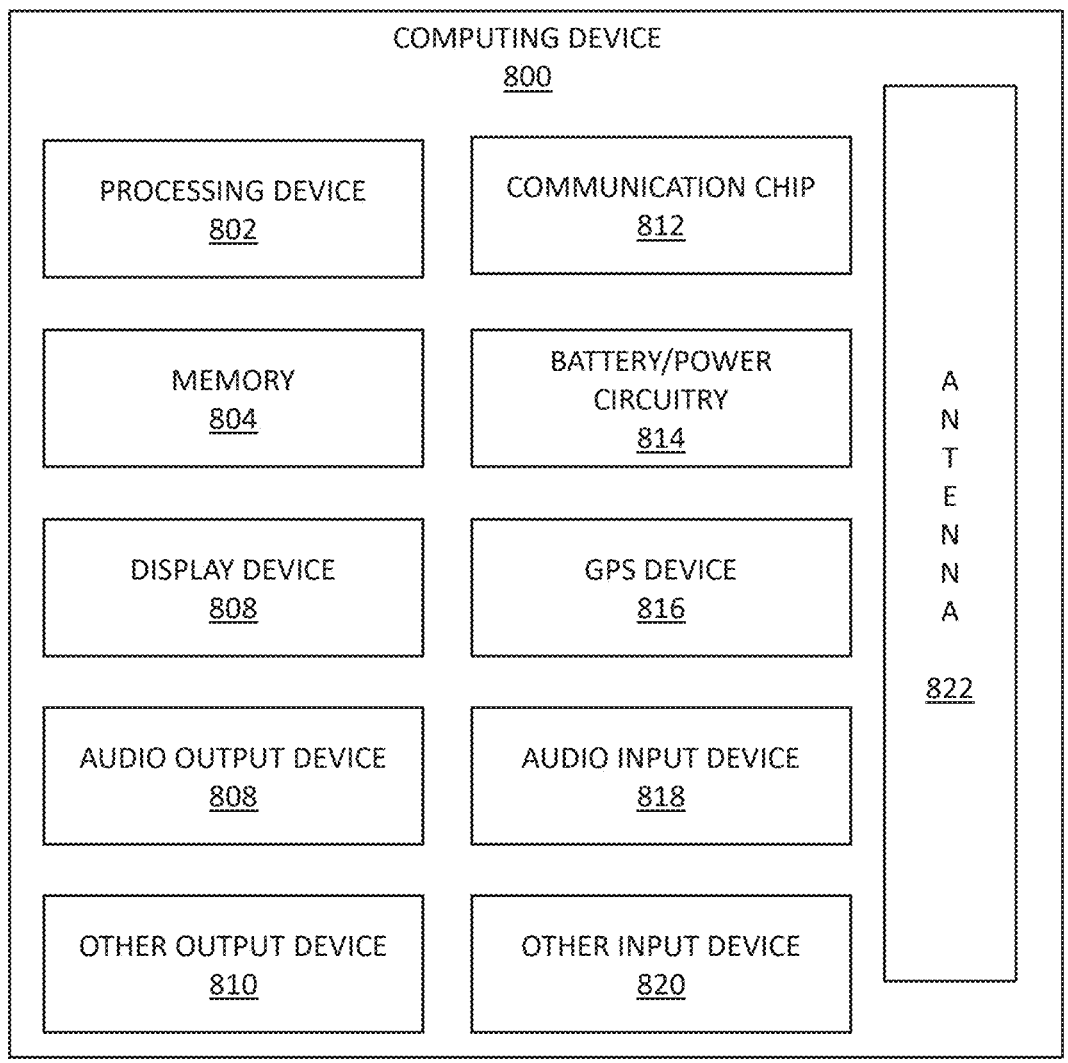
FIG. 8 is a block diagram of an example computing device, in accordance with various embodiments.

FIG. 8 is a block diagram of an example computing device 800, in accordance with various embodiments. In some embodiments, the computing device 800 can be used as at least part of the AI system 100. A number of components are illustrated in FIG. 8 as included in the computing device 800, but any one or more of these components may be omitted or duplicated, as suitable for the application. In some embodiments, some or all of the components included in the computing device 800 may be attached to one or more motherboards. In some embodiments, some or all of these components are fabricated onto a single system on a chip (SoC) die. Additionally, in various embodiments, the computing device 800 may not include one or more of the components illustrated in FIG. 8, but the computing device 800 may include interface circuitry for coupling to the one or more components. For example, the computing device 800 may not include a display device 806, but may include display device interface circuitry (e.g., a connector and driver circuitry) to which a display device 806 may be coupled. In another set of examples, the computing device 800 may not include an audio input device 818 or an audio output device 808 but may include audio input or output device interface circuitry (e.g., connectors and supporting circuitry) to which an audio input device 818 or audio output device 808 may be coupled.

The computing device 800 may include a processing device 802 (e.g., one or more processing devices). The processing device 802 processes electronic data from registers and/or memory to transform that electronic data into other electronic data that may be stored in registers and/or memory. The computing device 800 may include a memory 804, which may itself include one or more memory devices such as volatile memory (e.g., DRAM), nonvolatile memory (e.g., read-only memory (ROM)), high bandwidth memory (HBM), flash memory, solid state memory, and/or a hard drive. In some embodiments, the memory 804 may include memory that shares a die with the processing device 802. In some embodiments, the memory 804 includes one or more non-transitory computer-readable media storing instructions executable to perform operations for cache allocation in AI accelerators, e.g., the method 700 described above in conjunction with FIG. 7 or some operations performed by the cache allocation module 120. The instructions stored in the one or more non-transitory computer-readable media may be executed by the processing device 802.

In some embodiments, the computing device 800 may include a communication chip 812 (e.g., one or more communication chips). For example, the communication chip 812 may be configured for managing wireless communications for the transfer of data to and from the computing device 800. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

The communication chip 812 may implement any of a number of wireless standards or protocols, including but not limited to Institute for Electrical and Electronic Engineers (IEEE) standards including Wi-Fi (IEEE 802.10 family), IEEE 802.16 standards (e.g., IEEE 802.16-2005 Amendment), Long-Term Evolution (LTE) project along with any amendments, updates, and/or revisions (e.g., advanced LTE project, ultramobile broadband (UMB) project (also referred to as "3GPP2"), etc.). IEEE 802.16 compatible Broadband Wireless Access (BWA) networks are generally referred to as WiMAX networks, an acronym that stands for worldwide interoperability for microwave access, which is a certification mark for products that pass conformity and interoperability tests for the IEEE 802.16 standards. The communication chip 812 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chip 812 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 812 may operate in accordance with Code-division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 812 may operate in accordance with other wireless protocols in other embodiments. The computing device 800 may include an antenna 822 to facilitate wireless communications and/or to receive other wireless communications (such as AM or FM radio transmissions).

In some embodiments, the communication chip 812 may manage wired communications, such as electrical, optical, or any other suitable communication protocols (e.g., the Ethernet). As noted above, the communication chip 812 may include multiple communication chips. For instance, a first communication chip 812 may be dedicated to shorter-range wireless communications such as Wi-Fi or Bluetooth, and a second communication chip 812 may be dedicated to longer-range wireless communications such as global positioning system (GPS), EDGE, GPRS, CDMA, WiMAX, LTE, EV-DO, or others. In some embodiments, a first communication chip 812 may be dedicated to wireless communications, and a second communication chip 812 may be dedicated to wired communications.

The computing device 800 may include battery/power circuitry 814. The battery/power circuitry 814 may include one or more energy storage devices (e.g., batteries or capacitors) and/or circuitry for coupling components of the computing device 800 to an energy source separate from the computing device 800 (e.g., AC line power).

The computing device 800 may include a display device 806 (or corresponding interface circuitry, as discussed above). The display device 806 may include any visual indicators, such as a heads-up display, a computer monitor, a projector, a touchscreen display, a liquid crystal display (LCD), a light-emitting diode display, or a flat panel display, for example.

The computing device 800 may include an audio output device 808 (or corresponding interface circuitry, as discussed above). The audio output device 808 may include any device that generates an audible indicator, such as speakers, headsets, or earbuds, for example.

The computing device 800 may include an audio input device 818 (or corresponding interface circuitry, as discussed above). The audio input device 818 may include any device that generates a signal representative of a sound, such as microphones, microphone arrays, or digital instruments (e.g., instruments having a musical instrument digital interface (MIDI) output).

The computing device 800 may include a GPS device 816 (or corresponding interface circuitry, as discussed above). The GPS device 816 may be in communication with a satellite-based system and may receive a location of the computing device 800, as is known in the art.

The computing device 800 may include another output device 810 (or corresponding interface circuitry, as discussed above). Examples of the other output device 810 may include an audio codec, a video codec, a printer, a wired or wireless transmitter for providing information to other devices, or an additional storage device.

The computing device 800 may include another input device 820 (or corresponding interface circuitry, as discussed above). Examples of the other input device 820 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The computing device 800 may have any desired form factor, such as a handheld or mobile computer system (e.g., a cell phone, a smart phone, a mobile internet device, a music player, a tablet computer, a laptop computer, a netbook computer, an ultrabook computer, a personal digital assistant (PDA), an ultramobile personal computer, etc.), a desktop computer system, a server or other networked computing component, a printer, a scanner, a monitor, a set-top box, an entertainment control unit, a vehicle control unit, a digital camera, a digital video recorder, or a wearable computer system. In some embodiments, the computing device 800 may be any other electronic device that processes data.

SELECT EXAMPLES

The following paragraphs provide various examples of the embodiments disclosed herein.

Example 1 provides a method of cache allocation in an AI accelerator, including receiving a first data transfer request from a first compute engine in the AI accelerator, the first data transfer request including a request to read or write a cache line; installing the cache line in a first cache associated with the first compute engine; after receiving the first data transfer request, receiving a second data transfer request from a second compute engine in the AI accelerator, the second data transfer request including a request to read the cache line; and in response to the second data transfer request, installing the cache line in a second cache, in which the second cache is accessible by the second compute engine and one or more other compute engines in the AI accelerator, and the second cache is closer to a memory than the first cache.

Example 2 provides the method of example 1, in which the AI accelerator includes a plurality of cores, a core includes a compute engine and a cache, the first cache and the first compute engine are in a first core of the AI accelerator, and the second cache is in a second core of the AI accelerator.

Example 3 provides the method of example 2, in which the second core includes the second compute engine.

Example 4 provides the method of example 2 or 3, in which the second core includes a third compute engine, and the second compute engine is in a third core of the AI accelerator.

Example 5 provides the method of any one of examples 1-4, further including invalidating the cache line in the first cache.

Example 6 provides the method of any one of examples 1-5, further including receiving a third data transfer request from a third compute engine in the AI accelerator, the third data transfer request including a request to read another cache line installed in the first cache; and moving the another cache line from the first cache to the second cache.

Example 7 provides the method of any one of examples 1-6, in which the second cache is associated with the second compute engine, and the method further includes before receiving the second data transfer request, receiving a third data transfer request from a third compute engine in the AI accelerator, the third data transfer request including a request to read the cache line; installing the cache line in a third cache associated with the third compute engine; and after receiving the second data transfer request, invalidating the cache line in the first cache and in the third cache.

Example 8 provides the method of example 7, in which invalidating the cache line in the third cache includes changing a state of the cache line in the third cache to LRU.

Example 9 provides the method of any one of examples 1-8, further including before receiving the second data transfer request, receiving a third data transfer request from a third compute engine in the AI accelerator, the third data transfer request including a request to read the cache line; and transferring the cache line from the first cache to a third cache associated with the third compute engine.

Example 10 provides the method of example 9, in which transferring the cache line from the first cache to the third cache includes reducing a weight of the cache line in the third cache, the weight indicating a recency of the cache line being used by the third compute engine.

Example 11 provides one or more non-transitory computer-readable media storing instructions executable to perform operations of cache allocation in an AI accelerator, the operations including receiving a first data transfer request from a first compute engine in the AI accelerator, the first data transfer request including a request to read or write a cache line; installing the cache line in a first cache associated with the first compute engine; after receiving the first data transfer request, receiving a second data transfer request from a second compute engine in the AI accelerator, the second data transfer request including a request to read the cache line; and in response to the second data transfer request, installing the cache line in a second cache, in which the second cache is accessible by the second compute engine and one or more other compute engines in the AI accelerator, and the second cache is closer to a memory than the first cache.

Example 12 provides the one or more non-transitory computer-readable media of example 11, in which the AI accelerator includes a plurality of cores, a core includes a compute engine and a cache, the first cache and the first compute engine are in a first core of the AI accelerator, and the second cache is in a second core of the AI accelerator.

Example 13 provides the one or more non-transitory computer-readable media of example 11 or 12, in which the operations further include receiving a third data transfer request from a third compute engine in the AI accelerator, the third data transfer request including a request to read another cache line installed in the first cache; and moving the another cache line from the first cache to the second cache.

Example 14 provides the one or more non-transitory computer-readable media of any one of examples 11-13, in which the second cache is associated with the second compute engine, and the operations further includes before receiving the second data transfer request, receiving a third data transfer request from a third compute engine in the AI accelerator, the third data transfer request including a request to read the cache line; installing the cache line in a third cache associated with the third compute engine; and after receiving the second data transfer request, invalidating the cache line in the first cache and in the third cache.

Example 15 provides the one or more non-transitory computer-readable media of example 14, in which invalidating the cache line in the third cache includes changing a state of the cache line in the third cache to LRU.

Example 16 provides the one or more non-transitory computer-readable media of example 14 or 15, in which the operations further include before receiving the second data transfer request, receiving a third data transfer request from a third compute engine in the AI accelerator, the third data transfer request including a request to read the cache line; and transferring the cache line from the first cache to a third cache associated with the third compute engine.

Example 17 provides an apparatus, including a computer processor for executing computer program instructions; and a non-transitory computer-readable memory storing computer program instructions executable by the computer processor to perform operations including receiving a first data transfer request from a first compute engine in the AI accelerator, the first data transfer request including a request to read or write a cache line, installing the cache line in a first cache associated with the first compute engine, after receiving the first data transfer request, receiving a second data transfer request from a second compute engine in the AI accelerator, the second data transfer request including a request to read the cache line, and in response to the second data transfer request, installing the cache line in a second cache, in which the second cache is accessible by the second compute engine and one or more other compute engines in the AI accelerator, and the second cache is closer to a memory than the first cache.

Example 18 provides the apparatus of example 17, in which the operations further include receiving a third data transfer request from a third compute engine in the AI accelerator, the third data transfer request including a request to read another cache line installed in the first cache; and moving the another cache line from the first cache to the second cache.

Example 19 provides the apparatus of example 17 or 18, in which the second cache is associated with the second compute engine, and the operations further include before receiving the second data transfer request, receiving a third data transfer request from a third compute engine in the AI accelerator, the third data transfer request including a request to read the cache line; installing the cache line in a third cache associated with the third compute engine; and after receiving the second data transfer request, invalidating the cache line in the first cache and in the third cache.

Example 20 provides the apparatus of example 19, in which the operations further include before receiving the second data transfer request, receiving a third data transfer request from a third compute engine in the AI accelerator, the third data transfer request including a request to read the cache line; and transferring the cache line from the first cache to a third cache associated with the third compute engine.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize. These modifications may be made to the disclosure in light of the above detailed description.

The invention claimed is:

1. A method of cache allocation in an artificial intelligence (AI) accelerator, comprising:
   receiving a first data transfer request from a first compute engine in the AI accelerator, the first data transfer request comprising a request to read or write a cache line;
   installing the cache line in a first cache associated with the first compute engine;
   after receiving the first data transfer request, receiving a second data transfer request from a second compute engine in the AI accelerator, the second data transfer request comprising a request to read the cache line; and
   in response to the second data transfer request, installing the cache line in a second cache, wherein the second cache is accessible by the second compute engine and one or more other compute engines in the AI accelerator, and the second cache is closer to a memory than the first cache.

2. The method of claim 1, wherein the AI accelerator comprises a plurality of cores, a core comprises a compute engine and a cache, the first cache and the first compute engine are in a first core of the AI accelerator, and the second cache is in a second core of the AI accelerator.

3. The method of claim 2, wherein the second core comprises the second compute engine.

4. The method of claim 2, wherein the second core comprises a third compute engine, and the second compute engine is in a third core of the AI accelerator.

5. The method of claim 1, further comprising:
   invalidating the cache line in the first cache.

6. The method of claim 1, further comprising:
   receiving a third data transfer request from a third compute engine in the AI accelerator, the third data transfer request comprising a request to read another cache line installed in the first cache; and
   moving the another cache line from the first cache to the second cache.

7. The method of claim 1, wherein the second cache is associated with the second compute engine, and the method further comprises:
   before receiving the second data transfer request, receiving a third data transfer request from a third compute engine in the AI accelerator, the third data transfer request comprising a request to read the cache line;
   installing the cache line in a third cache associated with the third compute engine; and
   after receiving the second data transfer request, invalidating the cache line in the first cache and in the third cache.

8. The method of claim 7, wherein invalidating the cache line in the third cache comprises:
   changing a state of the cache line in the third cache to least recently used.

9. The method of claim 1, further comprising:
   before receiving the second data transfer request, receiving a third data transfer request from a third compute engine in the AI accelerator, the third data transfer request comprising a request to read the cache line; and
   transferring the cache line from the first cache to a third cache associated with the third compute engine.

10. The method of claim 9, wherein transferring the cache line from the first cache to the third cache comprises:
    reducing a weight of the cache line in the third cache, the weight indicating a recency of the cache line being used by the third compute engine.

11. One or more non-transitory computer-readable media storing instructions executable to perform operations of cache allocation in an artificial intelligence (AI) accelerator, the operations comprising:
    receiving a first data transfer request from a first compute engine in the AI accelerator, the first data transfer request comprising a request to read or write a cache line;
    installing the cache line in a first cache associated with the first compute engine;
    after receiving the first data transfer request, receiving a second data transfer request from a second compute engine in the AI accelerator, the second data transfer request comprising a request to read the cache line; and
    in response to the second data transfer request, installing the cache line in a second cache, wherein the second cache is accessible by the second compute engine and one or more other compute engines in the AI accelerator, and the second cache is closer to a memory than the first cache.

12. The one or more non-transitory computer-readable media of claim 11, wherein the AI accelerator comprises a plurality of cores, a core comprises a compute engine and a cache, the first cache and the first compute engine are in a first core of the AI accelerator, and the second cache is in a second core of the AI accelerator.

13. The one or more non-transitory computer-readable media of claim 11, wherein the operations further comprise:
    receiving a third data transfer request from a third compute engine in the AI accelerator, the third data transfer request comprising a request to read another cache line installed in the first cache; and
    moving the another cache line from the first cache to the second cache.

14. The one or more non-transitory computer-readable media of claim 11, wherein the second cache is associated with the second compute engine, and the operations further comprises:
    before receiving the second data transfer request, receiving a third data transfer request from a third compute engine in the AI accelerator, the third data transfer request comprising a request to read the cache line;
    installing the cache line in a third cache associated with the third compute engine; and
    after receiving the second data transfer request, invalidating the cache line in the first cache and in the third cache.

15. The one or more non-transitory computer-readable media of claim 14, wherein invalidating the cache line in the third cache comprises:
    changing a state of the cache line in the third cache to least recently used.

16. The one or more non-transitory computer-readable media of claim 14, wherein the operations further comprise:

before receiving the second data transfer request, receiving a third data transfer request from a third compute engine in the AI accelerator, the third data transfer request comprising a request to read the cache line; and
transferring the cache line from the first cache to a third cache associated with the third compute engine.

17. An apparatus, comprising:
a computer processor for executing computer program instructions; and
a non-transitory computer-readable memory storing computer program instructions executable by the computer processor to perform operations comprising:
receiving a first data transfer request from a first compute engine in the AI accelerator, the first data transfer request comprising a request to read or write a cache line,
installing the cache line in a first cache associated with the first compute engine,
after receiving the first data transfer request, receiving a second data transfer request from a second compute engine in the AI accelerator, the second data transfer request comprising a request to read the cache line, and
in response to the second data transfer request, installing the cache line in a second cache, wherein the second cache is accessible by the second compute engine and one or more other compute engines in the AI accelerator, and the second cache is closer to a memory than the first cache.

18. The apparatus of claim 17, wherein the operations further comprise:
receiving a third data transfer request from a third compute engine in the AI accelerator, the third data transfer request comprising a request to read another cache line installed in the first cache; and
moving the another cache line from the first cache to the second cache.

19. The apparatus of claim 17, wherein the second cache is associated with the second compute engine, and the operations further comprise:
before receiving the second data transfer request, receiving a third data transfer request from a third compute engine in the AI accelerator, the third data transfer request comprising a request to read the cache line;
installing the cache line in a third cache associated with the third compute engine; and
after receiving the second data transfer request, invalidating the cache line in the first cache and in the third cache.

20. The apparatus of claim 19, wherein the operations further comprise:
before receiving the second data transfer request, receiving a third data transfer request from a third compute engine in the AI accelerator, the third data transfer request comprising a request to read the cache line; and
transferring the cache line from the first cache to a third cache associated with the third compute engine.

* * * * *